United States Patent
Shi et al.

(10) Patent No.: US 11,438,785 B2
(45) Date of Patent: Sep. 6, 2022

(54) METHOD AND DEVICE FOR MEASURING INTERFERENCE OR SIGNAL RECEIVED POWER

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/386,382

(22) Filed: Jul. 27, 2021

(65) Prior Publication Data
US 2021/0360463 A1    Nov. 18, 2021

Related U.S. Application Data

(63) Continuation of application No. PCT/CN2019/074713, filed on Feb. 3, 2019.

(51) Int. Cl.
| | |
|---|---|
| *H04W 24/10* | (2009.01) |
| *H04B 17/336* | (2015.01) |
| *H04L 5/00* | (2006.01) |
| *H04L 25/02* | (2006.01) |

(52) U.S. Cl.
CPC ......... *H04W 24/10* (2013.01); *H04B 17/336* (2015.01); *H04L 5/0051* (2013.01); *H04L 25/0226* (2013.01)

(58) Field of Classification Search
CPC .... H04W 24/10; H04B 17/336; H04L 5/0051; H04L 25/0226
See application file for complete search history.

(56) References Cited

FOREIGN PATENT DOCUMENTS

| | | | | |
|---|---|---|---|---|
| CA | 2932945 | A1 | 6/2015 | |
| CN | 104813693 | A * | 7/2015 | ........... H04L 65/608 |
| CN | 104955061 | A | 9/2015 | |
| CN | 106572478 | A | 4/2017 | |
| CN | 103298114 | B * | 12/2018 | |
| JP | 6383999 | B2 * | 9/2018 | .......... H04W 52/146 |
| WO | 2017067618 | A1 | 4/2017 | |
| WO | WO-2018202144 | A1 * | 11/2018 | ............. H04L 1/248 |

OTHER PUBLICATIONS

English Translation from PE2E Search of CN 103298114 B. (Year: 2018).*

(Continued)

*Primary Examiner* — Omar J Ghowrwal
(74) *Attorney, Agent, or Firm* — Perkins Coie LLP

(57) ABSTRACT

The implementations of the present disclosure relate to a method and a device for measuring interference or signal received power, the method includes: a terminal device measures channel sounding reference signal SRS resources to obtain a reference signal received power RSRP value corresponding to at least one SRS resource; on the basis of the RSRP value corresponding to the at least one SRS resource, the terminal device determines a value to be reported; and the terminal device reports the value to be reported to a network device.

14 Claims, 4 Drawing Sheets

(56) References Cited

OTHER PUBLICATIONS

English Translation of PE2E Search of CN 104813693 A. (Year: 2015).*
English Translation of PE2E Search of JP 6383999 B2. (Year: 2018).*
International Search Report dated May 28, 2019 of PCT/CN2019/074713 (4 pages).
CMCC "Discussion on UE-UE cross link interference measurements and reporting" R1-1900408; 3GPP TSG RAN WG1 Ad-Hoc Meeting 1901; Taipei; Jan. 21-25, 2019. 8 pages.
Extended European Search Report for European Application No. 19912245.8 dated Dec. 9, 2021. 7 pages.
Vivo "UE-to-UE CLI measurements" R1-1900124; 3GPP TSG RAN WG1 Ad-Hoc Meeting 1901; Taipei; Jan. 21-25, 2019. 3 pages.
Examination Report for Indian Application No. 202117035633 dated Mar. 10, 2022. 6 pages with English translation.

* cited by examiner

METHOD AND DEVICE FOR MEASURING INTERFERENCE OR SIGNAL RECEIVED POWER

CROSS-REFERENCE TO RELATED APPLICATION

The present application is a continuation application of International PCT Application No. PCT/CN2019/074713, filed on Feb. 3, 2019, the entire content of which is hereby incorporated by reference.

TECHNICAL FIELD

The present disclosure relates to the field of communication, and more particularly, to a method and a device for interference or signal received power measurement.

BACKGROUND

New radio (NR) systems have higher requirements for communication quality. However, terminal devices usually interfered by other communication devices during communication, resulting in the decrease in communication quality. For example, while one terminal device is in downlink communication, another terminal device in an adjacent cell may be in uplink communication, and the terminal device in downlink communication may be interfered by uplink signals sent by the terminal device in uplink communication.

In order to control interference caused by other communication devices, the terminal devices need to measure interference or signal received power. Therefore, how to measure the interference or signal received power efficiently has become a problem to be solved urgently.

SUMMARY

Implementations of the present disclosure provide a method and device for interference or signal received power measurement, so as to measure the interference or signal received power efficiently.

In a first aspect, there is provided a method for interference or signal received power measurement, which includes: a terminal device measures a sounding reference signal (SRS) resource to obtain a reference signal received power (RSRP) value corresponding to at least one SRS resource; the terminal device determines a to-be-reported value based on the at least one RSRP value corresponding to the at least one SRS resource; and the terminal device reports the to-be-reported value to a network device.

In a second aspect, there is provided a method for interference or signal received power measurement, which includes: a network device receives a to-be-reported value sent by a terminal device; the network device determines at least one reference signal received power (RSRP) value corresponding to at least one sounding reference signal (SRS) resource based on the to-be-reported value, at least one RSRP value being obtained based on measurement on the at least one SRS resource; and the network device communicates with the terminal device based on the at least one RSRP value.

In a third aspect, there is provided a terminal device for performing the method according to the first aspect described above or any implementation thereof.

Specifically, the terminal device includes functional modules for performing the method according to the first aspect described above or any implementation thereof.

In a fourth aspect, there is provided a network device for performing the method according to the second aspect described above or any implementation thereof.

Specifically, the network device includes functional modules for performing the method according to the second aspect described above or any implementation thereof.

In a fifth aspect, there is provided a terminal device including a processor and a memory. The memory is configured to store a computer program, and the processor is configured to call and run the computer program stored in the memory to perform the method according to the first aspect described above or any implementations thereof.

In a sixth aspect, there is provided a network device including a processor and a memory. The memory is configured to store a computer program, and the processor is configured to call and run the computer program stored in the memory to perform the method according to the second aspect described above or any implementations thereof.

In a seventh aspect, there is provided a chip for implementing the method according to any one of the first and third aspects described above or any implementations thereof.

Specifically, the chip includes a processor configured call and run a computer program from a memory to enable a device having the chip installed thereon to perform the method according to any one of the first and second aspects described above or any implementations thereof.

In an eighth aspect, there is provided a computer readable storage medium for storing a computer program that enables a computer to perform the method according to any one of the first and second aspects described above or any implementations thereof.

In a ninth aspect, there is provided a computer program product including computer program instructions that enable a computer to perform the method according to any one of the first and second aspects described above or any implementations thereof.

In a tenth aspect, there is provided a computer program, which, when running on a computer, enables the computer to perform the method according to any one of the first and second aspects described above or any implementations thereof.

According to the above technical scheme, the terminal device measures the SRS resources, and then determines the to-be-reported value based on measurement results obtained by measuring the SRS resources. Since there are multiple aggressors or signals that cause interference to the terminal device, the terminal device can identify different aggressors or signals by measuring the SRS resources. Therefore, the terminal device can identify the aggressor or signals that cause interference to itself, by measuring the SRS resources, so that the measurement can be more efficient.

DETAILED DESCRIPTION

Technical schemes in implementations of the present disclosure will be described below with reference to the drawings in the implementations of the present disclosure. It is apparent that the implementations described are just some of the implementations of the present disclosure, but not all of the implementations of the present disclosure. According to the implementations of the present disclosure, all other implementations obtained by a person of ordinary skill in the art without making inventive efforts are within the protection scope of the present disclosure.

The implementations of the present disclosure may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunication System (UMTS), Wireless Local Area Networks (WLAN), Wireless Fidelity (WiFi), a next generation communication system or other communication systems.

Generally speaking, traditional communication systems support a limited quantity of connections and are easy to implement. However, with development of communication technology, a mobile communication system will not only support traditional communication, but also support, for example, device to device (D2D) communication, machine to machine (M2M) communication, machine type communication (MTC), vehicle to vehicle (V2V) communication, and the implementations of the present disclosure may also be applied to these communication systems.

Optionally, a communication system in the implementations of the present disclosure may be applied to a carrier aggregation (CA) scenario, a dual connectivity (DC) scenario, or a standalone (SA) scenario.

Figure 1:
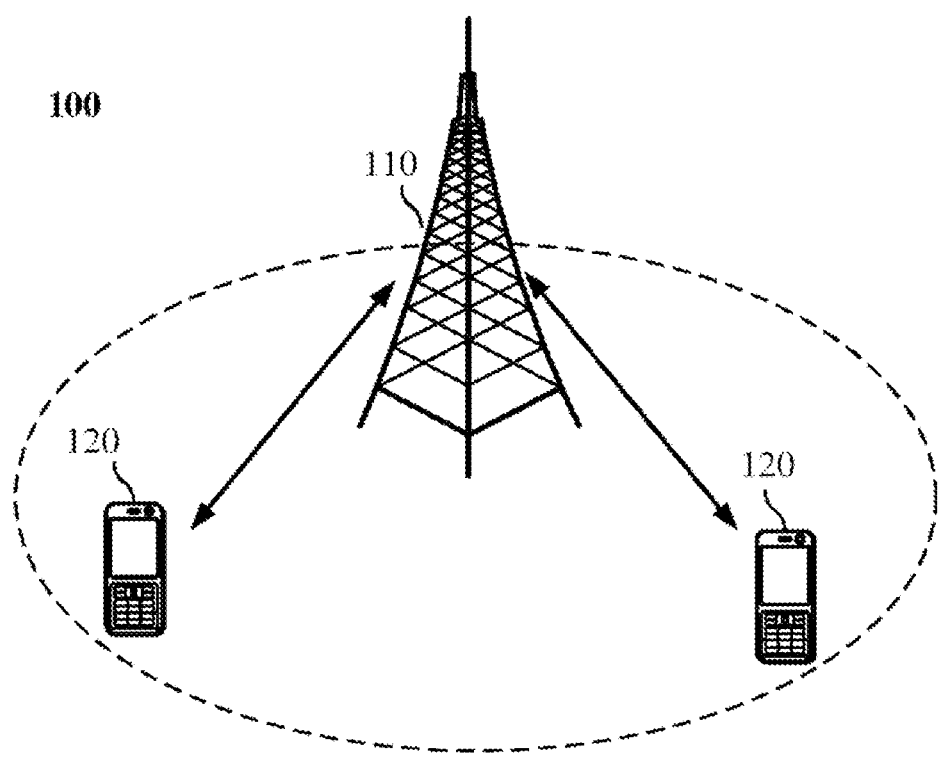
FIG. 1 is a schematic diagram of an architecture of a communication system provided by an implementation of the present disclosure.

Illustratively, a communication system 100 applied in the implementations of the present disclosure is shown in FIG. 1. The communication system 100 may include a network device 110, which may be a device that communicates with terminal devices 120 (or referred to as communication terminals, or terminals). The network device 110 may provide communication coverage for a specific geographical area, and may communicate with terminal devices located within the coverage area. Optionally, the network device 110 may be a base transceiver station (BTS) in a GSM system or CDMA system, a NodeB (NB) in a WCDMA system, an Evolutional Node B (eNB or eNodeB) in an LTE system, or a radio controller in a cloud radio access network (CRAN), or the network device may be a mobile switching center, a relay station, an access point, a vehicle-mounted device, a wearable device, a hub, a switch, a bridge, a router, a network side device in a 5G network, or a network device in a future evolved public land mobile network (PLMN).

The communication system 100 further includes at least one terminal device 120 located within the coverage area of the network device 110. The "terminal device" as used herein includes, but is not limited to, a device configured to receive/send communication signals through a connection via a wired circuit, for example, via a public switched telephone network (PSTN), a digital subscriber line (DSL), a digital cable, a direct cable, and/or another data connection/network, and/or via a wireless interface, for instance, for a cellular network, a wireless local area network (WLAN), a digital television network such as a digital video broadcasting-handheld (DVB-H) network, a satellite network, and an amplitude modulation-frequency modulation (AM-FM) broadcast transmitter, and/or another terminal device; and/or an Internet of Things (IoT) device. A terminal device configured to communicate via a wireless interface may be referred to as "a wireless communication terminal", "a wireless terminal" or "a mobile terminal". Examples of the mobile terminal include, but are not limited to, a satellite or cellular phone; a personal communications system (PCS) terminal capable of combining a cellular radio phone, data processing, facsimile, and data communication capabilities; a personal digital assistant (PDA) that may include a radio phone, a pager, internet/intranet access, a Web browser, a memo pad, a calendar, a Global Positioning System (GPS) receiver; and a conventional laptop and/or palmtop receiver or other electronic devices including a radio phone transceiver. The terminal device may refer to an access terminal, a user equipment (UE), a subscriber unit, a subscriber station, a mobile site, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal device in a 5G network, or a terminal device in a future evolved Public Land Mobile Network (PLMN).

Optionally, device to device (D2D) communication may be performed between the terminal devices 120.

FIG. 1 illustrates exemplarily one network device and two terminal devices. Optionally, the communication system 100 may include multiple network devices, and other quantities of terminal devices may be included within the coverage area of each network device, which is not limited in the implementations of the present disclosure.

Optionally, the communication system 100 may include other network entities, such as a network controller and a mobile management entity, which is not limited in the implementations of the present disclosure.

It should be understood that a device with a communication function in a network/system in the implementations of the present disclosure may be referred to as a communication device.

Taking the communication system 100 shown in FIG. 1 as an example, the communication device may include a network device 110 and terminal devices 120 which have communication functions, and the network device 110 and the terminal devices 120 may be the specific devices described above, and will not be described repeatedly herein. The communication device may also include other devices in the communication system 100, such as other network entities, such as network controllers and mobile management entities, which is not limited in the implementations of the present disclosure.

It should be understood that the terms "system" and "network" are often used interchangeably herein. The term "and/or" herein describes an association relationship between associated objects only, indicating that there may be three relationships, for example, A and/or B may indicate three cases: A alone, both A and B, and B alone. In addition, the symbol "/" herein generally indicates that there is a "or" relationship between the associated objects before and after "/".

Different services or applications (APPs) of terminal devices may have different requirements for an uplink data rate and a downlink data rate. For example, when a movie is watched on a mobile phone, the downlink data rate is generally higher than the uplink data rate. On the contrary, the uplink data rate of some services/APPs may be higher than the downlink data rate. For example, when local data is backed up to the cloud, the uplink data rate is higher than the downlink data rate. For the same service/APP, different operations may also tend to have different requirements for the uplink and downlink data rates. For example, when videos are uploaded to share, the uplink data rate may be higher than the downlink data rate, while when the videos shared by friends are watched, the downlink data rate may be higher than the uplink data rate.

Based on situations of the above actual services/APPs, if a wireless network maintains fixed or semi-static uplink and downlink resource allocation (e.g., fixed uplink and downlink time slot configuration in an LTE/NR system), optimal matching for service transmission may not be achieved in a short period of time, resulting in inefficient utilization of resources and a problem that the experience of terminal devices cannot be further improved.

In order to solve the above problems, a method of performing dynamical adjustment in uplink and downlink transmission directions (on uplink and downlink transmission resources) may be used. For example, if the amount of downlink data of the current cell or a terminal device increases, a network device may use more resources for downlink transmission (e.g., use more time slots for downlink transmission).

A flexible time slot format is proposed in an NR system. The time slot format includes information that how many downlink symbols, how many flexible symbols and how many uplink symbols are included in one time slot.

Configurations of some time slot formats supported in the current NR protocol may be shown in Table 1. In Table 1, one row represents one time slot, and it can be seen that each time slot has 14 symbols. "D" in Table 1 represents a downlink symbol, "U" represents an uplink symbol, and "F" represents a flexible symbol. It can be seen that time slot format 0 indicates that 14 symbols in a time slot are all downlink symbols, time slot format 1 indicates that 14 symbols in a time slot are all uplink symbols, and time slot format 20 indicates that first 2 symbols in a time slot are configured as downlink symbols, last one symbol is configured as an uplink symbol, and middle 11 symbols are configured as flexible symbols.

TABLE 1

| Slot format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |

If the time slot formats are modified relatively dynamically in a cell, or the network device modifies its corresponding slot formats for one or some terminal devices, additional interference may be caused (with respect to uplink and downlink configured to be static).

Figure 2:
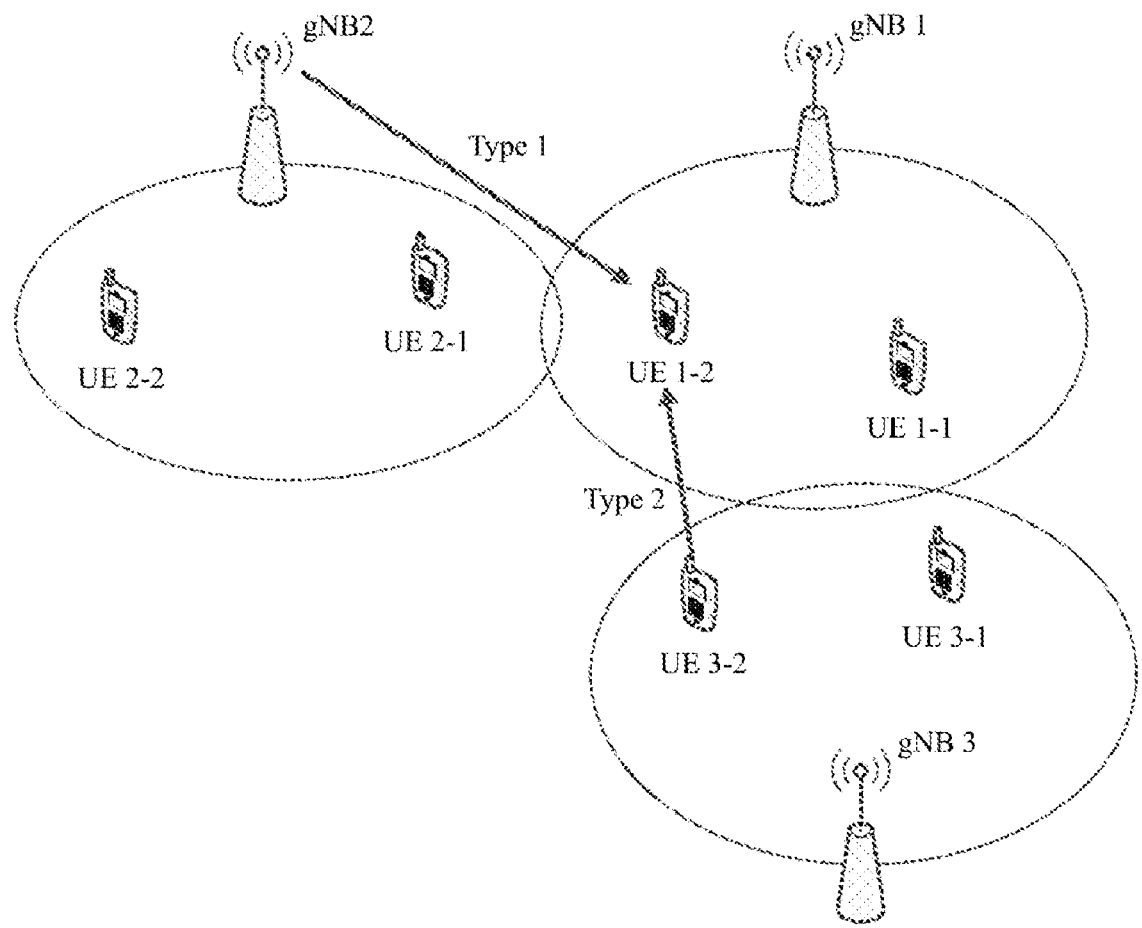
FIG. 2 is a schematic diagram of a terminal device receiving interference in downlink provided by an implementation of the present disclosure.

Taking FIG. 2 as an example, the following description will be provided. If adjacent cells all use the same uplink and downlink configuration, when UE 1-2 receives downlink signals, other cells are performing downlink signal transmission (if any), but there will be no uplink signal transmission, so UE 1-2 may only be interfered by signals sent by other base stations (e.g., type 1 interference in the figure).

If a relatively dynamic uplink/downlink configuration is supported, for example, the current traffic of UE 3-2 is mainly heavy uploaded data flow, then base station 3 may configure more uplink resources (e.g., more time slots are configured as full uplink symbols or more symbols in some time slots are configured as uplink) for transmission of UE 3-2. If uplink and downlink transmissions of UE 1-2 and UE 3-2 are different, additional interference may be caused, for example, type 2 interference shown in the figure. That is, when UE 1-2 receives the downlink data transmission, it may be possible that the UE 1-2 is interfered by uplink signals sent by its adjacent UE 3-2.

In addition, if the slot format does not change, the type 2 interference may also be caused. For example, all symbols in a time slot are flexible symbols (e.g., time slot format 2 in Table 1), gNB1 may use this time slot for downlink transmission of UE 1-2, while gNB3 may use this time slot for uplink transmission of UE 3-2, in this case, the type 2 interference described above will also be caused.

Therefore, in order to ensure the performance of the system or terminal device, the interference to the terminal device needs to be measured to identify an aggressor. In view of this, an implementation of the present disclosure provides a method for interference or signal measurement.

Figure 3:
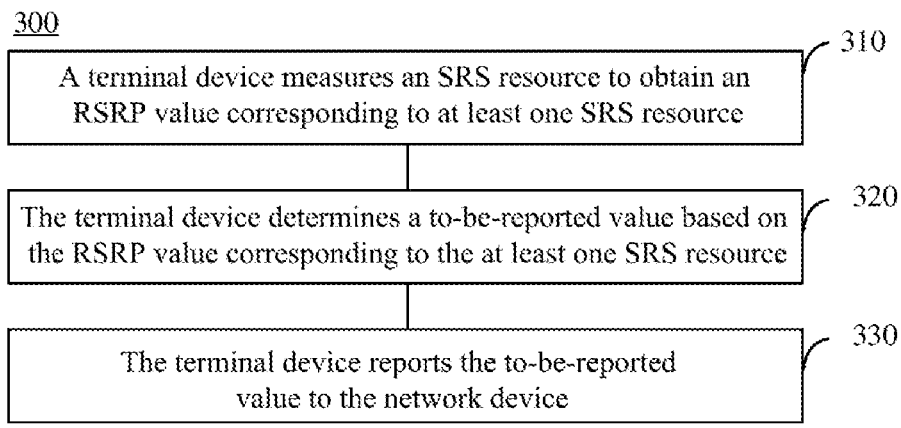
FIG. 3 is a schematic flow chart of a method for interference or signal received power measurement provided by an implementation of the present disclosure.

FIG. 3 is a schematic flow chart of a method 300 for interference or signal measurement in accordance with an implementation of the present disclosure.

It should be understood that the method in the implementation of the present disclosure may be applied to cross-link interference (CLI) measurement, for example, CLI may be interference caused by uplink sending of at least one terminal device to downlink reception of its adjacent terminal devices. It should be understood that the CLI measurement is not limited to be between terminals only, it may also be used in other similar situations, such as between network devices.

There are two ways for a measurement value or reporting value of the CLI measurement: a sounding reference signal-reference signal received power (SRS-RSRP) and a received signal strength indicator (RSSI).

The SRS-RSRP is an SRS-based RSRP, that is, an RSRP value obtained by measuring an SRS. A network device may configure an SRS for SRS-RSRP measurement of a terminal device, and information configured by the network device for the terminal device to measure an SRS may include, but is not limited to: time-frequency resource(s), SRS sequence(s), cyclic shift(s), and measurement periodicity.

With regard to the RSSI, the network device may configure a set of time-frequency resources for RSSI measurement of the terminal device, wherein the configuration may include an indication at a symbol level and an indication at a physical resource block (PRB) level.

It should be understood that if a measurement variable is the RSSI, the measurement of the terminal device is simpler, but different aggressors cannot be distinguished; or in order to identify the aggressors, the signaling overhead is too high.

In addition, the method in the implementation of the present disclosure may also be applied to other scenarios, for example, interference of other network devices to the terminal device, interference between adjacent cells, or type 1 interference mentioned above.

The method 300 may include at least portion of the following contents.

In 310, a terminal device measures SRS resources to obtain at least one RSRP value corresponding to at least one SRS resource.

In 320, the terminal device determines a to-be-reported value based on the at least one RSRP value corresponding to the at least one SRS resource.

In 330, the terminal device reports the to-be-reported value to the network device.

The way of reporting the to-be-reported value by the terminal device corresponds to the way of determining the to-be-reported value by the network device, and these two ways will be described below in combination with each other.

It should be understood that some specific descriptions for the way of reporting the to-be-reported value by the terminal device may also be adaptively applied in the process of determining the to-be-reported value by the network device, and some specific descriptions for the process of determining the to-be-reported value by the network device may also be adaptively applied in the process of reporting the to-be-reported value by the terminal device.

The RSRP values corresponding to the SRS resources may be understood as RSRP values obtained by measuring the SRS resources by the terminal device.

It should be understood that in the method in the implementation of the present disclosure, the terminal device may obtain at least one reference signal receiving quality (RSRQ) value or at least one signal to interference plus noise ratio (SINR) value in addition to the at least one RSRP value obtained by measuring the SRS resources, that is, the terminal device may measure the SRS resources to obtain at least one of the at least one RSRQ value, RSRP value and SINR value.

The RSRP represents the signal received power, and the RSRP can reflect a signal strength to a certain extent; the RSRQ represents signal reception quality, and the RSRQ can reflect signal transmission quality to a certain extent. The larger the RSRQ value of a signal, which can mean the better the transmission quality of the signal.

The SINR refers to a ratio of the strength of the received useful signal to the strength of the received interference signal (noise and interference), which can be simply understood as "signal-to-noise ratio". The SINR can reflect signal transmission quality to a certain extent. The larger the SINR value of a signal, which can mean the better the transmission quality of the signal.

It should also be understood that in the implementation of the present disclosure, the terminal device may measure an SRS on the SRS resources, and may also measure other reference signals on the SRS resources, which is not limited in the implementations of the present disclosure.

In the implementations of the present disclosure, description is made by taking the terminal device measuring SRS to obtain at least one RSRP value as an example. The SRS in the implementation of the present disclosure may be sent by other terminal devices, or may be sent by other network devices. The implementations of the present disclosure are not limited thereto.

Before the terminal device measures an SRS, the network device may send measurement configuration information, which may include, but is not limited to, SRS sequence information and SRS resource information, to the terminal device. After receiving the measurement configuration information, the terminal device may measure the SRS according to the measurement configuration information.

In an implementation, the network device may configure multiple SRS resources for the terminal device, so that the terminal device may measure the SRS on the multiple SRS resources to obtain RSRP values corresponding to the multiple SRS resources.

An $m^{th}$ RSRP value of the RSRP values corresponding to the multiple SRS resources is obtained by measuring the SRS on an $m^{th}$ SRS resource of the multiple SRS resources by the terminal device. That is, multiple RSRP values correspond to multiple SRS resources. For example, if the network device configures three SRS resources, SRS resource 1, SRS resource 2 and SRS resource 3, respectively, for the terminal device, then the terminal device may measure the SRS on the three SRS resources to obtain three RSRP values, RSRP 1, RSRP 2 and RSRP 3, respectively, wherein RSRP 1 is obtained by measuring the SRS on SRS resource 1 by the terminal device, RSRP 2 is obtained by measuring the SRS on SRS resource 2 by the terminal device, and RSRP 3 is obtained by measuring the SRS on SRS resource 3 by the terminal device.

Optionally, only one SRS port may be configured for each of the SRS resources.

Optionally, only one or two SRS ports may be configured for each of the SRS resources.

After obtaining the RSRP values corresponding to the multiple SRS resources through measurement, the terminal device may determine a set of RSRP values based on the RSRP values corresponding to the multiple SRS resources, and then determine to-be-reported value based on the set of RSRP values. It should be understood that a set of RSRP values includes at least one RSRP value. For convenience of description, a set of RSRP values mentioned herein will be referred to as first RSRP values.

As an example, in the implementation of the present disclosure, the terminal device may determine the first RSRP values based on the RSRP values corresponding to the multiple SRS resources according to its own implementation.

For example, the terminal device may randomly select at least one of the RSRP values corresponding to the multiple SRS resources as the first RSRP values.

As another example, the terminal device may select middle values from the RSRP values corresponding to the multiple SRS resources as the first RSRP values.

As an example, in the implementation of the present disclosure, the terminal device may determine the first RSRP values according to the protocol specification or the configuration of the network device. The first RSRP values may be any one of the following.

a. An average value of the RSRP values corresponding to the multiple SRS resources For example, if the network device configures three SRS resources, i.e., SRS resource 1, SRS resource 2 and SRS resource 3, respectively, for the terminal device, the terminal device measures the SRS on the three SRS resources to obtain three RSRP values, i.e., −150 dB, −65 dB and −121 dB, respectively, so the first RSRP value is −112 dB (taking a dB average value as an example).

The average value of the RSRP values corresponding to the multiple SRS resources may be a linear average value or a dB average value, which is not specifically limited in the implementations of the present disclosure.

By averaging the values, reliability of the whole estimation can be improved. In addition, since the quantity of the first RSRP values is the same as the quantity of values to be reported, the terminal device only reports one value to the network device, thus the overhead of resources required for reporting can be saved.

b. A maximum value of the RSRP values corresponding to the multiple SRS resources Optionally, if there is no threshold value of the RSRP values, the terminal device may determine the maximum value of the RSRP values corresponding to the multiple SRS resources as the first RSRP value.

Optionally, if there is a threshold value of the RSRP values, but there is no RSRP value, which is greater than, or greater than or equal to the threshold value, in the RSRP values corresponding to the multiple SRS resources, the terminal device may determine the maximum value of the RSRP values corresponding to the multiple SRS resources as the first RSRP value.

Optionally, the terminal device may determine the maximum value of the RSRP values corresponding to the multiple SRS resources as the first RSRP value.

The threshold value of the RSRP values may be preset on the terminal device based on a protocol, or sent to the terminal device by the network device. For example, the network device may send configuration information, which may include the threshold value, to the terminal device.

By taking the maximum value, the network device can know the most serious interference, thus the network device may not schedule the terminal device for transmission to, thereby reducing the frequency of interferences caused by uplink and downlink data transmissions.

c. A minimum value of the RSRP values corresponding to the multiple SRS resources By taking the minimum value, the network device can obtain the interference strength corresponding to an SRS resource with the least interference. In addition, the terminal device only reports one value to the network device, thus the overhead of resources required for reporting can be saved.

d. All of the RSRP values corresponding to the multiple SRS resources

By reporting the RSRP values corresponding to all measured SRS resources, the network device can identify strength of the interference caused by each aggressor, and further identify aggressors with larger interference, so that the network device can avoid the influence of these strong aggressors on downlink reception of the terminal device through uplink and downlink configuration or scheduling.

e. RSRP values, which are greater than, or greater than or equal to the threshold value, in the RSRP values corresponding to the multiple SRS resources It should be understood that the RSRP values greater than, or greater than or equal to the threshold value may be one RSRP value or multiple RSRP values.

f. K values of the RSRP values corresponding to the multiple SRS resources, wherein K is a positive integer.

Optionally, a value of K may be preset on the terminal device based on the protocol specification, or may be sent by the network device to the terminal device.

Optionally, the K values may be the largest K values of the plurality RSRP values, or the smallest K values of the plurality RSRP values, or any K values of the plurality RSRP values.

The terminal device selects RSRP values corresponding to a part of measured SRS resources for reporting, thus the overhead of resources required for reporting can be saved.

g. An average value of at least part of RSRP values, which are greater than, or greater than or equal to the threshold value, in the RSRP values corresponding to the multiple SRS resources Specifically, the terminal device may first select at least one RSRP value greater than, or greater than or equal to the threshold value from the RSRP values corresponding to the multiple SRS resources according to the threshold value, then select T RSRP values from the selected RSRP values greater than, or greater than or equal to the threshold value, and then average the T RSRP values to obtain a fifth RSRP value.

Optionally, a value of T may be less than or equal to a threshold value, wherein the threshold value may be configured by the network device or specified by the protocol.

The average value of the T RSRP values may be a linear average value or a dB average value, which is not specifically limited in the implementations of the present disclosure.

The terminal device reports an RSRP value to the network device, thus the overhead of resources required for reporting can be saved.

It should be noted that if the value of T is not specified by the protocol, or if the value of T is not configured by the network device, the terminal device can take the maximum value of the multiple RSRP values as the first RSRP value.

After the terminal device determines the first RSRP values, the to-be-reported value can be determined based on the first RSRP values. There are many ways of determining the to-be-reported value by the terminal device, which will be described in detail below.

In a possible implementation, the to-be-reported value may be the first RSRP value.

Exemplarily, if the first RSRP value is −130 dB, the terminal device may report −130 dB to the network device.

In another possible implementation, the terminal device may determine the to-be-reported value based on a measurement interval to which each of the first RSRP values belongs and a mapping relationship between measurement intervals of at least one RSRP value and the to-be-reported value.

The mapping relationship between the measurement intervals and the to-be-reported values may be agreed in advance by the terminal device and the network device, or the mapping relationship may be indicated to the terminal device by the network device through high-level signaling, or the corresponding relationship may be a predefined mapping relationship, for example, the mapping relationship is specified in the standard specification.

At least one measurement interval may include multiple measurement intervals, and a difference between a maximum value and a minimum value of each of other measurement intervals except a measurement interval to which a minimum RSRP value belongs and a measurement interval to which a maximum RSRP value belongs, in the multiple measurement intervals, is the same.

For example, the difference between the maximum value and the minimum value may be 1 dB, in this case the precision of reporting by the terminal device to the network device can be higher. Alternatively, the difference between the maximum value and the minimum value may also be 2 dB, in this case since the same dynamic range can be reported using fewer bits, the signaling overhead can be saved.

It should be understood that the difference between the maximum value and the minimum value may be 1.5 dB, 3 dB and the like in addition to 1 dB and 2 dB described above.

Table 2 to Table 4 show exemplarily the mapping relationships between the measurement intervals of three RSRP values and the to-be-reported values. It can be seen that the mapping relationships shown in Table 2 and Table 3 describe 128 value ranges of the RSRP values, the to-be-reported value is an integer greater than or equal to 0 and less than or equal to 127, and the size of each measurement interval is 1 dB. Each of the 128 value ranges may correspond to a to-be-reported value, and the 128 value ranges may be expressed using 7 bits. Therefore, when the terminal device reports the to-be-reported value to the network device, 7 bits may be occupied for reporting.

The mapping relationship shown in Table 4 describes 96 value ranges of the RSRP values. the to-be-reported value is an integer greater than or equal to 0 and less than or equal to 95, and the size of each measurement interval is 1 dB. Each of the 96 value ranges may correspond to a to-be-reported value, and the 96 value ranges may also be expressed using 7 bits. Therefore, when the terminal device reports the to-be-reported value to the network device, 7 bits may be occupied for reporting.

It can be seen from Table 2 that the to-be-reported value is 0 when the RSRP value is less than −156 dB, and the to-be-reported value is 127 when the RSRP value is greater than −31 dB.

It can be seen from Table 3 that the to-be-reported value is 0 when the RSRP value is less than −156 dB, and the to-be-reported value is 127 when the RSRP value is greater than or equal to −30 dB.

It can be seen from Table 4 that the to-be-reported value is 0 when the RSRP value is less than −139 dB, and the to-be-reported value is 95 when the RSRP value is greater than or equal to −45 dB.

For the network device, after the to-be-reported value reported by the terminal device is received, the first RSRP value can be determined according to the mapping relationship table between the measurement intervals of the RSRP values and the to-be-reported values, thereby determining an uplink and downlink transmission approach.

TABLE 2

| To-be-reported value | Measurement intervals of RSRP value | Unit |
| --- | --- | --- |
| To-be-reported value 0 | RSRP <− 156 | dB |
| To-be-reported value 1 | −156 ≤ RSRP <− 155 | dB |
| To-be-reported value 2 | −155 ≤ RSRP <− 154 | dB |
| To-be-reported value 3 | −154 ≤ RSRP <− 153 | dB |
| To-be-reported value 4 | −153 ≤ RSRP <− 152 | dB |
| To-be-reported value 5 | −152 ≤ RSRP <− 151 | dB |
| ... | ... | ... |
| To-be-reported value 124 | −33 ≤ RSRP <− 32 | dB |
| To-be-reported value 125 | −32 ≤ RSRP <− 31 | dB |
| To-be-reported value 126 | −31 ≤ RSRP | dB |
| To-be-reported value 127 | Infinity | dB |

TABLE 3

| To-be-reported value | Measurement intervals of RSRP value | Unit |
| --- | --- | --- |
| To-be-reported value 0 | RSRP <− 156 | dBm |
| To-be-reported value 1 | −156 ≤ RSRP <− 155 | dB |
| To-be-reported value 2 | −155 ≤ RSRP <− 154 | dB |
| To-be-reported value 3 | −154 ≤ RSRP <− 153 | dB |
| To-be-reported value 4 | −153 ≤ RSRP <− 152 | dB |
| To-be-reported value 5 | −152 ≤ RSRP <− 151 | dB |
| ... | ... | ... |
| To-be-reported value 124 | −33 ≤ RSRP <− 32 | dB |
| To-be-reported value 125 | −32 ≤ RSRP <− 31 | dB |
| To-be-reported value 126 | −31 ≤ RSRP <− 30 | dB |
| To-be-reported value 127 | −30 ≤ RSRP | dB |

TABLE 4

| To-be-reported value | Measurement intervals of RSRP value | Unit |
| --- | --- | --- |
| To-be-reported value 0 | RSRP <− 139 | dB |
| To-be-reported value 1 | −139 ≤ RSRP <− 138 | dB |
| ... | ... | ... |
| To-be-reported value 94 | −46 ≤ RSRP <− 45 | dB |
| To-be-reported value 95 | −45 ≤ RSRP | dB |

Optionally, the maximum value and/or the minimum value of each measurement interval may be configured by the network device. The network device can flexibly control the amount of the reported information by configuring the maximum value and/or the minimum value of each measurement interval.

Optionally, the difference between the maximum value and the minimum value of each measurement interval, that is, the size of each measurement interval may be configured by the network device. For example, in Table 2 to Table 4, the size of each measurement interval being 1 dB may be configured by the network device, or the network device may control the size of each measurement interval to be 2 dB, 3 dB, etc. In this way, the network device can flexibly determine the difference between the maximum value and the minimum value of each measurement interval according to different application scenarios.

Of course, the maximum value and/or the minimum value of each measurement interval, or the difference between the maximum value and the minimum value, may also be specified by the protocol, or may be negotiated in advance by the network device and the terminal device.

The term "and/or" herein describes an association relationship between associated objects only, indicating that there may be three relationships, for example, A and/or B may indicate three cases: A alone, both A and B, and B alone.

Optionally, in the implementation of the present disclosure, the form of the specific to-be-reported values is not limited specifically, that is, an order of the specific to-be-reported values may be changed. For example, RSRP<−156 and −31≤RSRP in table 2 may correspond to the first two to-be-reported values or the last two to-be-reported values, respectively.

It should be noted that the mapping relationships shown in Table 2 to Table 4 are only specific implementation modes of the implementations of the present disclosure, and will not limit the implementations of the present disclosure. Any corresponding relationship obtained by variations made on this basis is within the protection scope of the present disclosure.

For example, < and ≤ in each measurement interval may be exchanged. For example, in Table 2, the case in which the to-be-reported value is 0 when RSRP<−156 may be adjusted to the case in which the to-be-reported value is 0 when RSRP≤−156; and the case in which the to-be-reported value is 124 when −33≤RSRP<−32 may be adjusted to the case in which the to-be-reported value is 124 when −33<RSRP≤−32.

As another possible implementation, if the first RSRP values include at least two RSRP values, the terminal device may generate a difference for each of the at least two RSRP values in a differential manner according to the at least two RSRP values.

There are many ways for the terminal device to generate the difference for each of the at least two RSRP values.

As an example, the terminal device may take any one of the at least two RSRP values as a reference RSRP value, and differentiate other RSRP values of the at least two RSRP values with the reference RSRP value to obtain the difference for each of the at least two RSRP values.

The reference RSRP value may be the maximum value of the at least two RSRP values, the minimum value of the at least two RSRP values, or a RSRP value at the middle position of the at least two RSRP values. In the implementation of the present disclosure, whether the maximum value, the minimum value or the RSRP value at the middle position of the at least two RSRP values is specifically selected may be determined according to the actual situation.

In this case, the to-be-reported values may be the reference RSRP value and the difference between each of the RSRP values and the reference RSRP value. For example, the at least two RSRP values include RSRP 1, RSRP 2 and RSRP 3, wherein RSRP 1 is −156 dB, RSRP 2 is −130 dB, RSRP 3 is −40 dB, RSRP 1 is the reference RSRP value, the difference between RSRP 2 and RSRP 1 is −26 dB, and the difference between RSRP 3 and RSRP 1 is −116 dB. Then, the terminal device may report −156 dB, −26 dB and −116 dB to the network device.

Alternatively, the terminal device may determine the to-be-reported values based on difference intervals to which the differences belong and the mapping relationship between at least one difference interval and the to-be-reported values.

The mapping relationship between the difference intervals and the to-be-reported values may be agreed in advance by the terminal device and the network device, or the mapping relationship may be indicated to the terminal device by the network device through high-level signaling, or the corresponding relationship may be a predefined mapping relationship, for example, the mapping relationship is specified in the standard specification.

In the implementation of the present disclosure, at least one difference interval includes multiple difference intervals, and the difference between the maximum value and the minimum value of each of the multiple difference intervals is the same.

For example, the difference between the maximum value and the minimum value may be 1 dB, in this case the precision of reporting by the terminal device to the network device can be higher. Alternatively, the difference between the maximum value and the minimum value may also be 2 dB, in this case since the same dynamic range can be reported using fewer bits, the signaling overhead can be saved.

It should be understood that the difference between the maximum value and the minimum value may be 1 dB, 2 dB and the like in addition to 1.5 dB and 0.2 dB described above.

Table 5 illustrates exemplarily a mapping relationship between the difference intervals of the RSRP values and to-be-reported values. It can be seen that the mapping relationship shown in Table 5 describes 16 value ranges of the differences totally, the to-be-reported values are integers greater than or equal to 0 and less than or equal to 15, and the size of each measurement interval is 2 dB. Each of the 16 value ranges may correspond to a to-be-reported value, and the 16 value ranges may be expressed using 4 bits. Therefore, when the terminal device reports the to-be-reported value to the network device, 4 bits may be occupied for reporting.

TABLE 5

| To-be-reported value | Difference intervals of RSRP value | Unit |
| --- | --- | --- |
| To-be-reported value 0 | 0 ≥ ΔRSRP >− 2 | dB |
| To-be-reported value 1 | −2 ≥ ΔRSRP >− 4 | dB |
| To-be-reported value 2 | −4 ≥ ΔRSRP >− 6 | dB |
| To-be-reported value 3 | −6 ≥ ΔRSRP >− 8 | dB |
| To-be-reported value 4 | −8 ≥ ΔRSRP >− 10 | dB |
| To-be-reported value 5 | −10 ≥ ΔRSRP >− 12 | dB |
| To-be-reported value 6 | −12 ≥ ΔRSRP >− 14 | dB |
| To-be-reported value 7 | −14 ≥ ΔRSRP >− 16 | dB |
| To-be-reported value 8 | −16 ≥ ΔRSRP >− 18 | dB |
| To-be-reported value 9 | −18 ≥ ΔRSRP >− 20 | dB |
| To-be-reported value 10 | −20 ≥ ΔRSRP >− 22 | dB |
| To-be-reported value 11 | −22 ≥ ΔRSRP >− 24 | dB |
| To-be-reported value 12 | −24 ≥ ΔRSRP >− 26 | dB |
| To-be-reported value 13 | −26 ≥ ΔRSRP >− 28 | dB |
| To-be-reported value 14 | −28 ≥ ΔRSRP >− 30 | dB |
| To-be-reported value 15 | −30 ≥ ΔRSRP | dB |

It can be seen from table 5 that the to-be-reported value is 0 when the difference is greater than −2 dB and less than or equal to 0 dB, and the to-be-reported value is 15 when the difference is less than or equal to −30 dB.

For the network device, after the to-be-reported values reported by the terminal device are received, the difference for each of the RSRP values corresponding to the multiple SRS resources may be determined according to the mapping relationship table between the difference intervals of the RSRP values and the to-be-reported values. Further, the network device may determine the RSRP values corresponding to the multiple SRS resources in a differential manner according to the maximum value of the RSRP values and the difference value of each of the RSRP values, thereby determining an uplink and downlink transmission approach.

Optionally, the network device may differentiate the difference for each of the RSRP values with the maximum value of the RSRP values corresponding to the multiple SRS resources to generate the RSRP values corresponding to the multiple SRS resources.

Optionally, the network device may differentiate a difference for an $i^{th}$ RSRP value with an $(i-1)^{th}$ RSRP value of the at least two RSRP values to generate the $i^{th}$ RSRP value.

Optionally, the maximum value and/or the minimum value of each difference interval may be configured by the network device. The network device may flexibly control the amount of the reported information by configuring the maximum value and/or the minimum value of each difference interval.

Optionally, the difference between the maximum value and the minimum value of each difference interval, that is, the size of each difference interval may be configured by the network device. For example, the size of each difference interval in Table 5 being 2 dB may be configured by the network device, or the network device may control the size of each difference interval to be 1 dB, 0.5 dB, etc. In this way, the network device can flexibly determine the difference between the maximum value and the minimum value of each difference interval according to different application scenarios.

Of course, the maximum value and/or the minimum value of each difference interval, or the difference between the maximum value and the minimum value, may also be specified by the protocol, or may be negotiated in advance by the network device and the terminal device.

It should be noted that the mapping relationship shown in Table 5 is only a specific implementation mode of the implementations of the present disclosure, and will not limit to the implementations of the present disclosure. Any mapping relationship obtained by variations made on this basis is within the protection scope of the present disclosure.

For example, a specific order of mapping between the to-be-reported values and the differences may be changed, for example, the order may be reversed.

For another example, < and ≤ in each difference interval may be exchanged.

In this case, the to-be-reported values may be the reference RSRP value and a to-be-reported value corresponding to the difference between each of the RSRP values and the reference RSRP value. For example, the at least two RSRP values include RSRP 1, RSRP 2 and RSRP 3, wherein RSRP 1 is −156 dB, RSRP 2 is −130 dB, RSRP 3 is −40 dB, RSRP 1 is the reference RSRP value, the difference between RSRP 2 and RSRP 1 is −26 dB, and the difference between RSRP 3 and RSRP 1 is −116 dB. Then, the terminal device may report −156 dB, 13 and 15 to the network device.

As another example, the terminal device may differentiate the $i^{th}$ RSRP value with the $(i-1)^{th}$ RSRP value of the at least two RSRP values to generate the difference for the $i^{th}$ RSRP value. Alternatively, the terminal device may differentiate the $i^{th}$ RSRP value with the $(i-1)^{th}$ RSRP value to generate the difference for the $(i-1)^{th}$ RSRP value.

Before the terminal device differentiates the $i^{th}$ RSRP value with the $(i-1)^{th}$ RSRP value of the at least two RSRP values to generate the difference for the $i^{th}$ RSRP value, the terminal device may sort the at least two RSRP values.

The manner of sorting is not specifically limited in the implementations of the present disclosure. For example, the at least two RSRP values may be sorted in an order of magnitudes of the RSRP values, either in an ascending order or in a descending order.

As another example, the at least two RSRP values may be sorted in an order of magnitudes of identifiers of the SRS resources corresponding to the at least two RSRP values, either in an ascending order or in a descending order.

In this case, the terminal device reports a $p^{th}$ RSRP value of at least two RSRP values, and simultaneously reports the difference for each of the RSRP values. Optionally, the $p^{th}$ RSRP value may be the maximum value of the at least two RSRP values, the minimum value of the at least two RSRP values, or the RSRP value at the middle position of the at least two RSRP values.

For example, the at least two RSRP values include RSRP 1, RSRP 2 and RSRP 3, wherein a value of RSRP 1 is −156 dB, a value of RSRP 2 is −130 dB, a value of RSRP 3 is −40 dB, the difference between the RSRP 1 and the RSRP 2 is −26 dB, and the difference between RSRP 2 and RSRP 3 is −90 dB. Then, the terminal device may report the value of RSRP 1, i.e., −156 dB, to the network device, and simultaneously report −26 dB and −90 dB to the network device.

Alternatively, the terminal device may determine the to-be-reported values based on the difference intervals to which the differences belong and the mapping relationship between at least one difference interval and the to-be-reported values (e.g., Table 5).

For example, the at least two RSRP values include RSRP 1, RSRP 2 and RSRP 3, wherein a value of RSRP 1 is −156 dB, a value of RSRP 2 is −130 dB, a value of RSRP 3 is −40 dB, the difference between the RSRP 1 and the RSRP 2 is −26 dB, and the difference between the RSRP 2 and the RSRP 3 is −90 dB. Then, the terminal device may report −156 dB, 13 and 15 to the network device.

The differential manner is just taken as an example hereinabove, and the RSRP values of the at least two RSRP values may also be calculated in other manners. For example, the terminal device may generate a ratio corresponding to each of the RSRP values through dividing the maximum value of the at least two RSRP values by other RSRP values. Then the terminal device can determine the to-be-reported values according to the mapping relationship between ratios and the to-be-reported values.

In another implementation, the network device may configure an SRS resource for the terminal device, so that the terminal device may measure the SRS on the SRS resource to obtain an RSRP value.

As an example, the terminal device may report the RSRP value to the network device.

As another example, the terminal device may determine the to-be-reported values according to a measurement interval of the RSRP value to which the RSRP value belongs and the mapping relationship between the measurement interval and the to-be-reported value. For example, if the RSRP value is −152 dB, the terminal device may report 5 to the network device according to Table 2.

It should be understood that in the implementations of the present disclosure, one SRS resource may include at least one port, or the terminal device may have at least one receiving antenna. How to determine an RSRP value corresponding to one SRS resource when the SRS resource includes at least one port and how to determine an RSRP value corresponding to one SRS resource when the terminal device has at least one receiving antenna will be described below, respectively. An RSRP value corresponding to an SRS resource may be understood as an RSRP value obtained by measuring an SRS on the SRS resource.

When an SRS resource includes at least one port, the terminal device may determine an RSRP value corresponding to the SRS resource according to configuration information of the SRS resource.

As an example, if an SRS resource includes a port, the terminal device may measure an SRS transmitted by the port to obtain an RSRP value. Then, the terminal device may report the RSRP value or a to-be-reported value corresponding to the RSRP value to the network device.

As another example, if an SRS resource (referred to as a first SRS resource) includes multiple ports, i.e., port 0, . . . , and port L, respectively, the terminal device may determine a set of RSRP values corresponding to the multiple ports, i.e., RSRP 0, RSRP 1, . . . , and RSRP L, respectively, according to SRSs transmitted by port 0 to port L, and then determine RSRP values corresponding to the first SRS resource based on the set of RSRP values corresponding to the multiple ports. An $n^{th}$ RSRP value in the set of RSRP values corresponding to the multiple ports is obtained by measuring an SRS transmitted by an $n^{th}$ port of the multiple ports on one SRS resource by the terminal device, $0 \leq n \leq L$.

Optionally, one SRS resource may include 2 ports.

In one situation, the terminal device may determine the RSRP value corresponding to the first SRS resource based on the set of RSRP values corresponding to the multiple ports according to its own implementation.

For example, the terminal device may randomly select at least one RSRP value from the set of RSRP values corresponding to the multiple ports as the RSRP value corresponding to the first SRS resource.

As another example, the terminal device may select an RSRP value at the middle position from the set of RSRP values corresponding to the multiple ports as the RSRP value corresponding to the first SRS resource.

Optionally, the RSRP value corresponding to the first SRS resource may be not less than any value in the set of RSRP values corresponding to the multiple ports. Thus, appearance of low-quality terminal devices can be avoided, thereby guaranteeing the overall performance of the network.

In another situation, the terminal device may determine the RSRP value corresponding to the first SRS resource according to the protocol specification or configuration of the network device. Then, the terminal device may determine the to-be-reported value based on the determined RSRP value.

It should be understood that the scheme in which the terminal device determines the to-be-reported values based on the RSRP values has been described in detail hereinabove, and will not repeated herein for the sake of brevity.

The RSRP value corresponding to the first resource may be any one of the following.

a. An average value of the set of RSRP values corresponding to the multiple ports For example, if an SRS resource configured by the network device for the terminal device has three ports, i.e., port 1, port 2 and port 3, respectively, the terminal device measures an SRS transmitted by each of the three ports, to obtain three RSRP values, i.e., −150 dB, −65 dB and −121 dB, respectively, then the RSRP value corresponding to the SRS resource is −112 dB, and then the terminal device may determine the to-be-reported value based on −112 dB.

The average value of the first RSRP values may be a linear average value or a dB average value, which is not specifically limited in the implementations of the present disclosure.

By averaging the values, reliability of the whole estimation can be improved. In addition, only one value is reported, thus the overhead of resources required for reporting can be saved.

b. A maximum value of a set of RSRP values corresponding to multiple ports

Optionally, if there is no threshold value of the RSRP values, the terminal device may determine the maximum value of the set of RSRP values corresponding to the multiple ports as the RSRP value corresponding to the first SRS resource.

Optionally, if there is a threshold value of the RSRP values, but there is no RSRP value, which is greater than, or greater than or equal to the threshold value, in the set of RSRP values corresponding to the multiple ports, the terminal device may determine the maximum value of the set of RSRP values corresponding to the multiple ports as the RSRP value corresponding to the first SRS resource.

The threshold value of the RSRP values may be preset on the terminal device based on a protocol, or sent to the terminal device by the network device. For example, the network device may send configuration information, which may include the threshold value, to the terminal device.

By taking the maximum value, the network device can know the most serious interference, thus the network device may not schedule the terminal device for transmission, thereby reducing the frequency of interferences caused by uplink and downlink data transmissions. In addition, only one value is reported, thus the overhead of resources required for reporting can be saved.

c. A minimum value of a set of RSRP values corresponding to multiple ports

By taking the minimum value, the network device can obtain the interference strength corresponding to an SRS resource with the least interference. In addition, only one value is reported, thus the overhead of resources required for reporting can be saved.

d. All RSRP values in a set of RSRP values corresponding to multiple ports

For example, interference to downlink reception of terminal device B is caused by uplink sending of terminal device A, and terminal device A sends an SRS through one SRS resource which has two ports. Terminal device A has two antennas for simultaneous sending, and SRSs transmitted by the two ports are sent from the two antennas, respectively. RSRP 0 obtained by measuring the SRS transmitted from port 0 by terminal device B is very large, and RSRP 1 obtained by measuring the SRS transmitted from port 1 is very small, so terminal device B may take both RSRP 0 and RSRP 1 as RSRP values corresponding to this SRS resource. Then terminal device B reports RSRP 0 and RSRP 1 to the network device, and the network device may schedule terminal device A to send uplink from port 1, thus the interference to terminal device B is smaller, and terminal device A is prevented from sending uplink signals from port 0 when terminal device B performs downlink reception.

By taking RSRP values corresponding to all ports, it is beneficial for the network device to reducing the interference by selecting different ports when the network device changes uplink and downlink.

e. RSRP values, which are greater than, or greater than or equal to a threshold value, in the set of RSRP values corresponding to the multiple ports It should be understood that the RSRP values greater than, or greater than or equal to the threshold value may be one RSRP value or multiple RSRP values.

For example, interference to downlink reception of terminal device B is caused by uplink sending of terminal device A, and terminal device A sends an SRS through one SRS resource which has two ports. Terminal device A has two antennas for simultaneous sending, and SRSs transmitted by the two ports are sent from the two antennas, respectively. RSRP 0 obtained by measuring the SRS transmitted from port 0 by terminal device B is very large and greater than the threshold value, and RSRP 1 obtained by measuring the SRS transmitted from port 1 is very small and less than the threshold value, so terminal device B may take RSRP 0 as an RSRP value corresponding to this SRS resource. Then the terminal device B may report RSRP 0 to the network device, and the network device may schedule terminal device B to send uplink from port 1, thus the interference to terminal device B is smaller, and terminal device A is prevented from sending uplink signals from port 0 when terminal device B performs downlink reception.

By taking the RSRP value with finer granularity, it is beneficial for the network device to reducing the interference by selecting different ports when the network device changes uplink and downlink.

f. K values in the set of RSRP values corresponding to the multiple ports, wherein K is a positive integer.

Optionally, a value of K may be preset on the terminal device based on a protocol, or may be sent by the network device to the terminal device.

Optionally, the K values may be the largest K values of the multiple RSRP values, or the smallest K values of the multiple RSRP values, or any K values of the multiple RSRP values.

The terminal device selects RSRP values corresponding to a part of measured SRS resources for reporting, thus the overhead of resources required for reporting can be saved.

g. An average value of at least part of the RSRP values, which are greater than, or greater than or equal to the threshold value, in the set of RSRP values corresponding to the multiple ports Specifically, the terminal device may first select at least one RSRP value greater than or equal to the threshold value from the set of RSRP values corresponding to the multiple ports according to the threshold value, then select T RSRP values from the selected RSRP values greater than or equal to the threshold value, and then average the T RSRP values to obtain the RSRP value corresponding to the SRS resource.

Optionally, a value of T may be less than or equal to a threshold value, wherein the threshold value may be configured by the network device or specified by the protocol.

The average value of the T RSRP values may be a linear average value or a dB average value, which is not specifically limited in the implementations of the present disclosure.

Optionally, in the implementations of the present disclosure, the terminal device may also report a port identifier of an SRS corresponding to the first SRS resource to the network device. For example, the first SRS resource has port 0 and port 1, and the RSRP value corresponding to the SRS resource is an RSRP value obtained by measuring an SRS transmitted by port 0 by the terminal device, so the terminal device may report the identifier of port 0 to the network device.

Optionally, the port identifier may include, but is not limited to, a number of a port of the first SRS resource, a port ID and the like.

When the terminal device has at least one receiving antenna, the terminal device may determine an RSRP value corresponding to a second SRS resource on one SRS resource (referred to as the second SRS resource) according to the SRS received by at least one receiving antenna, that is, an RSRP value obtained by measuring the SRS on the second SRS resource. Then, the terminal device may determine the to-be-reported value based on the RSRP value.

It should be understood that the scheme in which the terminal device determines the to-be-reported value based on the RSRP values has been described in detail hereinabove, and will not repeated herein.

As an example, if the terminal device has a receiving antenna, the terminal device may measure an SRS received by the receiving antenna on the second SRS resource to obtain an RSRP value, and then report the RSRP value to the network device.

As another example, if the terminal device has multiple receiving antennas, i.e., antenna 0, . . . , antenna M, respectively, for the second SRS resource, the terminal device may measure an SRS received by each receiving antenna from antenna 0 to antenna M to obtain a set of RSRP values corresponding to the multiple receiving antennas, i.e., RSRP 0, RSRP 1, RSRP M, respectively, and then determine the RSRP value obtained by measuring the SRS on the second SRS resource based on the set of RSRP values corresponding to the multiple receiving antennas An $s^{th}$ RSRP value in the set of RSRP values corresponding to the multiple receiving antennas is obtained by measuring an SRS received by an $s^{th}$ receiving antenna of the multiple receiving antennas by the terminal device, $0 \leq s \leq M$.

In one situation, the terminal device may determine the RSRP value corresponding to the second SRS resource based on the set of RSRP values corresponding to the multiple receiving antennas according to its own implementation.

For example, the terminal device may randomly select at least one RSRP value from the set of RSRP values corresponding to the multiple receiving antennas as the RSRP value corresponding to the second SRS resource.

As another example, the terminal device may select an RSRP value at the middle position from the set of RSRP values corresponding to the multiple receiving antennas as the RSRP value corresponding to the second SRS resource.

Optionally, the RSRP value corresponding to the second SRS resource may be not less than any value in the set of RSRP values corresponding to the multiple receiving antennas.

Optionally, the RSRP value corresponding to the second SRS resource may be not greater than any value in the set of RSRP values corresponding to the multiple receiving antennas.

Thus, appearance of low-quality terminal devices can be avoided, thereby guaranteeing the overall performance of the network.

In another situation, the terminal device may determine the RSRP value corresponding to the second SRS resource according to the protocol specification or configuration of the network device. The RSRP value corresponding to the second SRS resource may be any one of the following values.

a. An average value of the set of RSRP values corresponding to the multiple receiving antennas The average value of third RSRP values may be a linear average value or a dB average value, which is not specifically limited in the implementations of the present disclosure.

By averaging the values, reliability of the whole estimation can be improved. In addition, only one value is reported, thus the overhead of resources required for reporting can be saved.

b. A maximum value of the set of RSRP values corresponding to the multiple receiving antennas Optionally, if there is no threshold value of the RSRP values, the terminal device may determine the maximum value of the set of RSRP values corresponding to the multiple receiving antennas as the RSRP value corresponding to the second SRS resource.

Optionally, if there is a threshold value of the RSRP values, but there is no RSRP value greater than, or greater than or equal to the threshold value in the set of RSRP values corresponding to the multiple receiving antennas, the terminal device may determine the maximum value of the set of RSRP values corresponding to the multiple receiving antennas as the RSRP value corresponding to the second SRS resource.

The threshold value of the RSRP values may be preset on the terminal device based on the protocol, or sent to the terminal device by the network device. For example, the network device may send configuration information, which may include the threshold value, to the terminal device.

By taking the maximum value, the network device can know the most serious interference, thus the network device may not schedule the terminal device for transmission, thereby reducing the frequency of interferences caused by uplink and downlink data transmissions.

c. A minimum value of the set of RSRP values corresponding to the multiple receiving antennas For example, interference to downlink reception of terminal device B is caused by uplink sending of terminal device A, and terminal device A sends an SRS through one SRS resource.

Terminal device A has two antennas for simultaneous sending, and Terminal device B has two antennas. RSRP 0 obtained by measuring an SRS received through antenna 0 by terminal device B is very large, and RSRP 1 obtained by measuring an SRS received through antenna 1 is very small, so terminal device B may take RSRP 1 as an RSRP value corresponding to this SRS resource and report RSRP 1 to the network device.

By taking the minimum value, the network device can obtain the interference strength corresponding to an SRS resource with the least interference. As long as the interference on one receiving antenna is small, the terminal device can receive signals from the receiving antenna with the small interference.

d. All RSRP values in the set of RSRP values corresponding to the multiple receiving antennas By taking RSRP values corresponding to all receiving antennas, it is beneficial for the network device to reducing the interference by selecting different receiving antennas when the network device changes uplink and downlink.

e. RSRP values, which are greater than, or greater than or equal to a threshold value, in the set of RSRP values corresponding to the multiple receiving antennas It should be understood that the RSRP values greater than, or greater than or equal to the threshold value may be one RSRP value or multiple RSRP values.

By taking the RSRP value with finer granularity, it is beneficial for the network device to reducing the interference by selecting different receiving antennas when the network device changes uplink and downlink.

f. K values in the set of RSRP values corresponding to the multiple receiving antennas, where K is a positive integer.

Optionally, a value of K may be preset on the terminal device based on protocol specification, or may be sent by the network device to the terminal device.

Optionally, the K values may be the largest K values in the set of RSRP values corresponding to the multiple receiving antennas, or the smallest K values in the set of RSRP values corresponding to the multiple receiving antennas, or any K values in the set of RSRP values corresponding to the multiple receiving antennas.

g. An average value of at least part of the RSRP values, which are greater than, or greater than or equal to the threshold value, in the set of RSRP values corresponding to the multiple receiving antennas Specifically, the terminal device may first select at least one RSRP value greater than or equal to the threshold value from the set of RSRP values corresponding to the multiple receiving antennas according to the threshold value, then select T RSRP values from the selected RSRP values greater than or equal to the threshold value, and then average the T RSRP values to obtain the RSRP value corresponding to the second SRS resource.

Optionally, a value of T may be less than or equal to a threshold value, wherein the threshold value may be configured by the network device or specified by the protocol.

The average value of the T RSRP values may be a linear average value or a dB average value, which is not specifically limited in the implementations of the present disclosure.

Optionally, in the implementations of the present disclosure, the terminal device may also report a receiving antenna identifier corresponding to the RSRP value obtained by measuring the SRS on the second SRS resource to the network device. For example, the terminal device has receiving antenna 1 and receiving antenna 2, and RSRP 1 is an RSRP value obtained by measuring an SRS received though receiving antenna 1 by the terminal device, so the terminal device may report an identifier of receiving antenna 1 to the network device.

Optionally, the receiving antenna identifier may include, but is not limited to, a number of the receiving antennal in all receiving antennas, a port ID and the like.

It should be understood that various implementation modes of the implementations of the present disclosure may be carried out separately or in combination, which is not limited in the implementations of the present disclosure.

For example, the implementation in which the terminal device has multiple receiving antennas may be combined with the implementation in which one SRS resource has multiple ports.

For convenience of description, the RSRP value corresponding to the first SRS resource including the multiple ports are referred to as the second RSRP value, and the RSRP value obtained by measuring SRSs received by the multiple receiving antennas of the terminal device are referred to as the third RSRP value. Specifically, if interference to downlink reception of terminal device B is caused by uplink sending of terminal device A, for the first SRS resource, if the first SRS resource has the multiple ports and terminal device B has the multiple receiving antennas, terminal device B may first determine the second RSRP value according to the implementation described above. For example, RSRP 0 is the maximum value of the set of RSRP values corresponding to the multiple ports, and a port corresponding to the maximum value is port 0, wherein RSRP 0 is obtained by measuring an SRS transmitted from port 0 by the terminal device, and the SRS transmitted from port 0 is received by each of the multiple receiving antennas of terminal device B, then the third RSRP value is obtained by measuring an SRS received by each of the receiving antennas by terminal device B, and then the terminal device may determine the to-be-reported value based on the third RSRP value.

Alternatively, terminal device B may first determine the third RSRP value, for example, a receiving antenna corresponding to the third RSRP value is receiving antenna 1, then an SRS is transmitted from each of the multiple ports of the SRS resources, receiving antenna 1 receives the SRS transmitted from each port to obtain the second RSRP value, and then the terminal device may determine the to-be-reported value according to the second RSRP value.

As another example, the implementation in which the network device configures multiple SRS resources for the terminal device may also be combined with the implementation in which one SRS resource has multiple ports and the terminal device has multiple receiving antennas. Specifically, the terminal device may first determine the RSRP value corresponding to each SRS resource in the manner described above, and then determine the to-be-reported value based on the RSRP value corresponding to each SRS resource.

If the to-be-reported value include multiple values, the terminal device may also determine a reporting order of the multiple values in information to be reported.

Optionally, the order in which the terminal device reports the multiple values to the network device may be determined according to the magnitude of the multiple values. For example, the multiple values may be reported in a descending order; or the multiple values may be reported in an ascending order; or the multiple values may be reported in an ascending order from a middle value of the multiple values, and then in a descending order from the middle value; or the multiple values may be reported in a descending order from the middle value, and then in an ascending order from the middle value.

Optionally, the order in which the terminal device reports the multiple values to the network device may be determined according to any one of magnitudes of the SRS resource identifiers, magnitudes of the port identifiers of the SRS resources and magnitudes of the receiving antenna identifiers corresponding to the multiple values. For example, the multiple values may be reported in a descending order of the magnitudes of the SRS resource identifiers corresponding to the multiple values; or the multiple values may be reported in an ascending order of the magnitudes of the SRS resource identifiers corresponding to the multiple values.

The SRS resources corresponding to the multiple values may be understood as follows: RSRP 1 is obtained by measuring an SRS on SRS resource 1 by the terminal device, and a to-be-reported value X is obtained based on RSRP 1, thus an SRS resource corresponding to the to-be-reported value X is SRS resource 1.

Optionally, the method in accordance with the implementation of the present disclosure may further include: the terminal device reports at least one of the SRS resource identifier, the port identifier and the receiving antenna identifier corresponding to the to-be-reported value to the network device. Thus, the network device can identify which aggressor, which port of the SRS resource and which receiving antenna of the terminal device the to-be-reported value corresponds to, so that the uplink and downlink transmission approach can be better determined.

Optionally, in the implementations of the present disclosure, the terminal device may report the to-be-reported value to the network device through radio resource control (RRC) signaling.

Optionally, in the implementations of the present disclosure, the terminal device may report the to-be-reported value to the network device through media access control (MAC) control element (CE).

Optionally, in the implementations of the present disclosure, the terminal device may report the to-be-reported value to the network device through a physical uplink control channel (PUCCH).

After receiving the to-be-reported value, the network device may determine the uplink and downlink transmission approach according to the to-be-reported value.

For example, if the RSRP values corresponding to one or some SRS resources reported by the terminal device are large, the network device may avoid the interference of aggressors with large RSRP values to the terminal device through scheduling or configuration.

As another example, if the RSRP values corresponding to one or some SRS resources reported by the terminal device are small, the network device may perform scheduling on resources corresponding to aggressors with small RSRP values without affecting the performance of the current terminal device.

In the implementation of the present disclosure, the terminal device measures the SRS resources, and then determines the to-be-reported value based on a measurement result obtained by measuring the SRS resources. Since there are multiple aggressors or signals that cause interference to the terminal device, the terminal device can identify different aggressors or signals by measuring the SRS resources. Therefore, the terminal device can identify the aggressors or signals that cause interference to it by measuring the SRS resources, so that the measurement can be more efficient.

Figure 4:
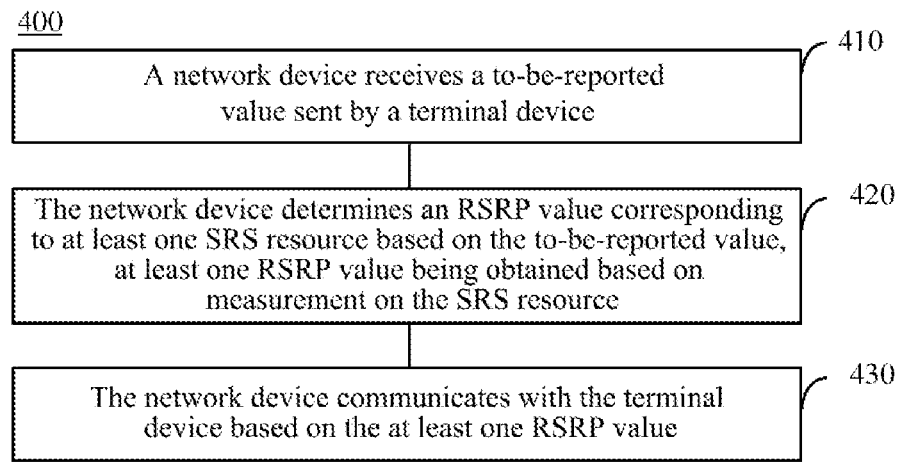
FIG. 4 is a schematic flow chart of another method for interference or signal received power measurement provided by an implementation of the present disclosure.

FIG. 4 is a schematic flow chart of a method 400 for interference or signal measurement in accordance with an implementation of the present disclosure. The method may be performed by a network device. The method 400 includes at least portion of the following contents.

In 410, a network device receives a to-be-reported value sent by a terminal device.

In 420, the network device determines at least one RSRP value corresponding to at least one SRS resource based on the to-be-reported value, at least one RSRP value being obtained based on measurement of the SRS resource.

In 430, the network device communicates with the terminal device based on the at least one RSRP value.

It should be understood that although the methods 300 and 400 are separately described above, the methods 300 and 400 are not intended to be independent, and description for each of the methods may be referred each other. For example, the related description for the method 300 may be applied to the method 400.

It should be understood that magnitudes of numbers of the foregoing processes do not mean execution sequences in various implementations of the present disclosure. The execution sequence of the processes should be determined according to their functions and internal logics, and should not form any limitation on implementation processes of the implementations of the present disclosure.

The communication methods in accordance with the implementations of the present disclosure have been described in detail above, and communication devices in accordance with implementations of the present disclosure will be described below with reference to FIGS. 5 to 7.

Technical features described in the method implementations are applicable to the following device implementations.

Figure 5:
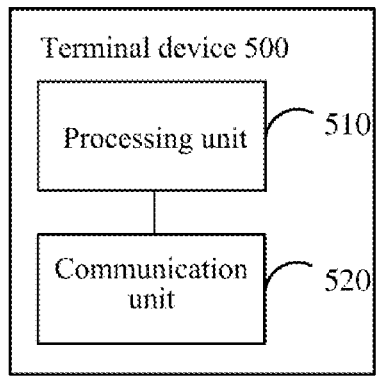
FIG. 5 is a schematic block diagram of a terminal device in accordance with an implementation of the present disclosure.

FIG. 5 shows a schematic block diagram of a terminal device 500 in accordance with an implementation of the present disclosure. As shown in FIG. 5, the terminal device 500 includes a processing unit 510 and a communication unit 520.

The processing unit 510 is configured to measure SRS resources to obtain at least one RSRP value corresponding to at least one SRS resource.

The processing unit 510 is further configured to determine a to-be-reported value based on the at least one RSRP value corresponding to the at least one SRS resource.

The communication unit 520 is configured to report the to-be-reported value to a network device.

Optionally, the processing unit 510 is specifically configured to measure multiple SRS resources to obtain multiple RSRP values, wherein an $m^{th}$ RSRP value of the multiple RSRP values is obtained by measuring an $m^{th}$ SRS resource of the multiple SRS resources by the terminal device.

Optionally, only one SRS port is configured for each of the SRS resources.

Optionally, only one or two SRS ports are configured for each of the SRS resources.

Optionally, if a first SRS resource measured by the terminal device includes multiple ports, the processing unit 510 is specifically configured to perform measurement on each of the multiple ports of the first SRS resource to obtain a set of RSRP values corresponding to the multiple ports, wherein an $n^{th}$ RSRP value in the set of RSRP values corresponding to the multiple ports is obtained by measuring an SRS transmitted from an $n^{th}$ port of the multiple ports by the terminal device; and determine an RSRP value corresponding to the first SRS resource based on the set of RSRP values corresponding to the multiple ports, wherein the RSRP value corresponding to the first SRS resource is an RSRP value obtained by measuring the first SRS resource by the terminal device.

Optionally, the RSRP value corresponding to the first SRS resource is any one of the following:
an average value of the set of RSRP values corresponding to the multiple ports;
a maximum value of the set of RSRP values corresponding to the multiple ports;
a minimum value of the set of RSRP values corresponding to the multiple ports;
all RSRP values in the set of RSRP values corresponding to the multiple ports;
RSRP values, which are greater than, or greater than or equal to a threshold value, in the set of RSRP values corresponding to the multiple ports;
K values in the set of RSRP values corresponding to the multiple ports, wherein K is a positive integer; and
an average value of at least part of the RSRP values, which are greater than, or greater than or equal to the threshold value, in the set of RSRP values corresponding to the multiple ports.

Optionally, the RSRP value corresponding to the first SRS resource is not less than any value in the set of RSRP values corresponding to the multiple ports of the first SRS resource.

Optionally, the communication unit 520 is further configured to report a port identifier corresponding to the RSRP value corresponding to the first SRS resource to the network device.

Optionally, if the terminal device has multiple receiving antennas, the processing unit 510 is specifically configured to obtain a set of RSRP values corresponding to the multiple receiving antennas on a second SRS resource of the at least one SRS resource, wherein an $s^{th}$ RSRP value in the set of RSRP values corresponding to the multiple receiving antennas corresponds to an $s^{th}$ receiving antenna of the multiple receiving antennas of the terminal device; and determine an RSRP value obtained by measuring the second SRS resource based on the set of RSRP values corresponding to the multiple receiving antennas.

Optionally, the RSRP value obtained by measuring the second SRS resource is any one of the following:
an average value of the set of RSRP values corresponding to the multiple receiving antennas;
a maximum value of the set of RSRP values corresponding to the multiple receiving antennas;
a minimum value of the set of RSRP values corresponding to the multiple receiving antennas;
all RSRP values in the set of RSRP values corresponding to the multiple receiving antennas;
RSRP values, which are greater than, or greater than or equal to a threshold value in the set of RSRP values corresponding to the multiple receiving antennas;
K values in the set of RSRP values corresponding to the multiple receiving antennas, wherein K is a positive integer; and
an average value of at least part of the RSRP values, which are greater than, or greater than or equal to the threshold value, in the set of RSRP values corresponding to the multiple receiving antennas.

Optionally, the RSRP value obtained by measuring the second SRS resource is not less than any value in the set of RSRP values corresponding to the multiple receiving antennas.

Optionally, the RSRP value obtained by measuring the second SRS resource is not greater than any value in the set of RSRP values corresponding to the multiple receiving antennas.

Optionally, the communication unit 520 is further configured to report a receiving antenna identifier corresponding to the RSRP value obtained by measuring the second SRS resource to the network device.

Optionally, the processing unit 510 is specifically configured to determine a set of RSRP values based on the at least one RSRP value corresponding to the at least one SRS resource; and determine the to-be-reported value based on the set of RSRP values.

Optionally, if the at least one RSRP value corresponding to the at least one SRS resource includes RSRP values corresponding to multiple SRS resources, the set of RSRP values are any one of the following:
an average value of the RSRP values corresponding to the multiple SRS resources;
a maximum value of the RSRP values corresponding to the multiple SRS resources;
a minimum value of the RSRP values corresponding to the multiple SRS resources;
all of the RSRP values corresponding to the multiple SRS resources;
RSRP values, which are greater than, or greater than or equal to a threshold value, in the RSRP values corresponding to the multiple SRS resources;
K values in the RSRP values corresponding to the multiple SRS resources, wherein K is a positive integer; and
an average value of at least part of RSRP values, which are greater than, or greater than or equal to the threshold value, in the RSRP values corresponding to the multiple SRS resources.

Optionally, the processing unit 510 is specifically configured to determine the to-be-reported value based on a measurement interval to which each RSRP value in the set of RSRP values belongs and a mapping relationship between at least one measurement interval and to-be-reported values.

Optionally, the at least one measurement interval includes multiple measurement intervals, and a difference between a maximum value and a minimum value of each of other measurement intervals except a measurement interval to which a minimum RSRP value belongs and a measurement interval to which a maximum RSRP value belongs, in the multiple measurement intervals, is the same.

Optionally, in the mapping relationship between the measurement intervals and the to-be-reported values, the difference between the maximum value and the minimum value of the measurement interval is 1 dB or greater than or less than 1 dB.

Optionally, the maximum value and/or the minimum value are configured by the network device.

Optionally, the difference between the maximum value and the minimum value is configured by the network device.

Optionally, the to-be-reported value is a $0^{th}$ value when the RSRP value is less than −156 dB, and the to-be-reported value is a $127^{th}$ value when the RSRP value is greater than −31 dB; or the to-be-reported value is a $0^{th}$ value when the RSRP value is less than −156 dB, and the to-be-reported value is a $127^{th}$ value when the RSRP value is greater than or equal to −30 dB; or the to-be-reported value is a $0^{th}$ value when the RSRP value is less than −139 dB, and the to-be-reported value is a $95^{th}$ value when the RSRP value is greater than or equal to −45 dB.

Optionally, the to-be-reported value is an integer greater than or equal to 0 and less than or equal to 127.

Optionally, the set of RSRP values includes at least two RSRP values, and the processing unit 510 is specifically configured to generate a difference for each of the at least two RSRP values in a differential manner according to the at least two RSRP values; and determine the to-be-reported value based on difference intervals to which the differences belong and a mapping relationship between at least one difference interval and to-be-reported values.

Optionally, the processing unit 510 is specifically configured to differentiate a maximum RSRP value of the at least two RSRP values with each of other RSRP values of the at least two RSRP values to generate a difference for each of the at least two RSRP values.

Optionally, the processing unit 510 is specifically configured to differentiate an $i^{th}$ RSRP value with an $(i-1)^{th}$ RSRP value of the at least two RSRP values to generate a difference for the $i^{th}$ RSRP value.

Optionally, the processing unit 510 is further configured to sort the at least two RSRP values.

Optionally, the at least one difference interval includes multiple difference intervals, and a difference between a maximum value and a minimum value of each of the multiple difference intervals is the same.

Optionally, in the mapping relationship between the difference intervals and the to-be-reported values, the difference between the maximum value and the minimum value of the difference interval is 2 dB or greater than 2 dB or less than 2 dB.

Optionally, the maximum value and/or the minimum value are configured by the network device.

Optionally, the difference between the maximum value and the minimum value is configured by the network device.

Optionally, the to-be-reported value is a $0^{th}$ value when the difference is greater than −2 dB and less than or equal to 0 dB, and the to-be-reported value is a $15^{th}$ value when the difference is less than or equal to −30 dB.

Optionally, the to-be-reported value is an integer greater than or equal to 0 and less than or equal to 15.

Optionally, if the to-be-reported value includes multiple values, an order in which the terminal device reports the multiple values to the network device is determined according to magnitudes of the multiple values; or an order in which the terminal device reports the multiple values to the network device is determined according to magnitudes of SRS resource identifiers corresponding to the multiple values.

Optionally, the communication unit 520 is further configured to report an SRS resource identifier corresponding to the to-be-reported value to the network device.

Optionally, the threshold value is preset on the terminal device, or the threshold value is sent by the network device to the terminal device.

Optionally, a value of the K is preset on the terminal device, or a value of the K is sent by the network device to the terminal device.

Optionally, the terminal device performs reporting to the network device through an RRC signaling, a MAC CE or a PUCCH.

Optionally, the interference or signal received power measurement includes CLI measurement.

It should be understood that the terminal device 500 may correspond to the terminal device in the method 300, and may implement corresponding operations of the terminal device in the method 300, which will not be repeated herein for sake of brevity.

Figure 6:
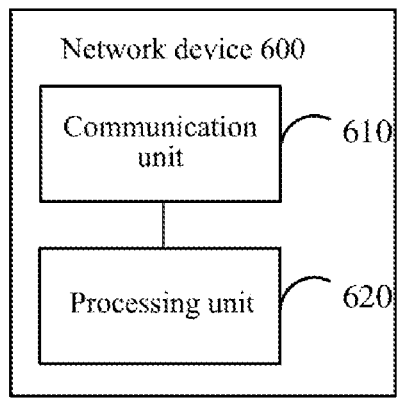
FIG. 6 is a schematic block diagram of a network device in accordance with an implementation of the present disclosure.

FIG. 6 is a schematic block diagram of a network device 600 in accordance with an implementation of the present disclosure. As shown in FIG. 6, the network device 600 includes a communication unit 610 and a processing unit 620.

The communication unit 610 is configured to receive a to-be-reported value sent by a terminal device.

The processing unit 620 is configured to determine at least one reference signal received power (RSRP) value corresponding to at least one sounding reference signal (SRS) resource based on the to-be-reported value, wherein the at least one RSRP value is obtained by measuring the at least one SRS resource.

The processing unit 620 is further configured to communicate with the terminal device based on the at least one RSRP value.

Optionally, only one SRS port is configured for each of the SRS resources.

Optionally, only one or two SRS ports are configured for each of the SRS resources.

Optionally, if a first SRS resource of the at least one SRS resource includes multiple ports, an RSRP value corresponding to the first SRS resource is any one of the following:

an average value of a set of RSRP values corresponding to the multiple ports;

a maximum value of the set of RSRP values corresponding to the multiple ports;

a minimum value of the set of RSRP values corresponding to the multiple ports;

all RSRP values in the set of RSRP values corresponding to the multiple ports;

RSRP values, which are greater than, or greater than or equal to a threshold value, in the set of RSRP values corresponding to the multiple ports;

K values in the set of RSRP values corresponding to the multiple ports, wherein K is a positive integer; and an average value of at least part of the RSRP values, which are greater than, or greater than or equal to the threshold value, in the set of RSRP values corresponding to the multiple ports.

Optionally, if a first SRS resource of the at least one SRS resource includes multiple ports, the RSRP value corresponding to the first SRS resource is not less than any value in the set of RSRP values corresponding to the multiple ports of the first SRS resources.

Optionally, the communication unit 610 is further configured to receive a port identifier corresponding to the RSRP value corresponding to the first SRS resource reported by the terminal device.

Optionally, if the terminal device has multiple receiving antennas, an RSRP value obtained by measuring a second SRS resource of the at least one SRS resource is any one of the following:

an average value of a set of RSRP values corresponding to the multiple receiving antennas;

a maximum value of the set of RSRP values corresponding to the multiple receiving antennas;

a minimum value of the set of RSRP values corresponding to the multiple receiving antennas;

all RSRP values in the set of RSRP values corresponding to the multiple receiving antennas;

RSRP values, which are greater than, or greater than or equal to a threshold value, in the set of RSRP values corresponding to the multiple receiving antennas;

K values in the set of RSRP values corresponding to the multiple receiving antennas, wherein K is a positive integer; and an average value of at least part of RSRP values, which are greater than, or greater than or equal to the threshold value, in the set of RSRP values corresponding to the multiple receiving antennas.

Optionally, if the terminal device has multiple receiving antennas, an RSRP value corresponding to a second SRS resource of the at least one SRS resource is not less than any value in the set of RSRP values corresponding to the multiple receiving antennas.

Optionally, if the terminal device has multiple receiving antennas, an RSRP value corresponding to a second SRS resource of the at least one SRS resource is not greater than any value in the set of RSRP values corresponding to the multiple receiving antennas.

Optionally, the communication unit 610 is further configured to receive at least one receiving antenna identifier corresponding to the at least one SRS resource reported by the terminal device.

Optionally, if the at least one RSRP value corresponding to the at least one SRS resource includes RSRP values corresponding to multiple SRS resources, the set of RSRP values are any one of the following:

an average value of the RSRP values corresponding to the multiple SRS resources;

a maximum value of the RSRP values corresponding to the multiple SRS resources;

a minimum value of the RSRP values corresponding to the multiple SRS resources;

all of the RSRP values corresponding to the multiple SRS resources;

RSRP values, which are greater than, or greater than or equal to a threshold value, in the RSRP values corresponding to the multiple SRS resources;

K values in the RSRP values corresponding to the multiple SRS resources, wherein K is a positive integer; and an average value of at least part of the RSRP values, which are greater than, or greater than or equal to the threshold value, in the RSRP values corresponding to the multiple SRS resources.

Optionally, the processing unit 620 is specifically configured to determine the at least one RSRP value corresponding to the at least one SRS resource based on the to-be-reported value and a mapping relationship between measurement intervals of at least one RSRP value and to-be-reported values.

Optionally, the at least one measurement interval includes multiple measurement intervals, and a difference between a maximum value and a minimum value of each of other measurement intervals except a measurement interval to which a minimum RSRP value belongs and a measurement interval to which a maximum RSRP value belongs, in the multiple measurement intervals, is the same.

Optionally, in the mapping relationship between the measurement intervals and the to-be-reported values, the difference between the maximum value and the minimum value of the measurement interval is 1 dB or greater than or less than 1 dB.

Optionally, the processing unit 620 is configured to determine the maximum value and/or the minimum value.

Optionally, the processing unit 620 is configured to determine the difference between the maximum value and the minimum value.

Optionally, the to-be-reported value is a $0^{th}$ value when the RSRP value is less than −156 dB, and the to-be-reported value is a $127^{th}$ value when the RSRP value is greater than −31 dB; or the to-be-reported value is a $0^{th}$ value when the RSRP value is less than −156 dB, and the to-be-reported value is a $127^{th}$ value when the RSRP value is greater than or equal to −30 dB; or the to-be-reported value is a $0^{th}$ value when the RSRP value is less than −139 dB, and the to-be-reported value is a $95^{th}$ value when the RSRP value is greater than or equal to −45 dB.

Optionally, the to-be-reported value is an integer greater than or equal to 0 and less than or equal to 127.

Optionally, the processing unit 620 is specifically configured to determine a difference for each of RSRP values corresponding to multiple SRS resources based on the to-be-reported value and a mapping relationship between at least one measurement interval and to-be-reported values; and determine the RSRP values corresponding to the multiple SRS resources in a differential manner according to a maximum value of the RSRP values corresponding to the multiple SRS resources and the difference for each of the RSRP values.

Optionally, the processing unit 620 is specifically configured to differentiate the difference for each of the RSRP values respectively with the maximum value of the RSRP values corresponding to the multiple SRS resources to generate the RSRP values corresponding to the multiple SRS resources.

Optionally, the processing unit 620 is specifically configured to differentiate a difference for an $i^{th}$ RSRP value with an $(i-1)^{th}$ RSRP value of the at least two RSRP values to generate the $i^{th}$ RSRP value.

Optionally, the at least one difference interval includes multiple difference intervals, and a difference between a maximum value and a minimum value of each of the multiple difference intervals is the same.

Optionally, in the mapping relationship between the difference intervals and the to-be-reported values, the difference between the maximum value and the minimum value of the difference interval is 2 dB or greater than 2 dB or less than 2 dB.

Optionally, the processing unit 620 is configured to determine the maximum value and/or the minimum value.

Optionally, the processing unit 620 is configured to determine the difference between the maximum value and the minimum value.

Optionally, in an implementation of the present disclosure, the to-be-reported value is a 0th value when the difference is greater than −2 dB and less than or equal to 0 dB, and the to-be-reported value is a 15$^{th}$ value when the difference is less than or equal to −30 dB.

Optionally, the to-be-reported value is an integer greater than or equal to 0 and less than or equal to 15.

Optionally, the communication unit 610 is further configured to receive an SRS resource identifier corresponding to the to-be-reported value reported by the terminal device.

Optionally, the communication unit 610 is further configured to send first configuration information to the terminal device, the first configuration information including the threshold value.

Optionally, the communication unit 610 is further configured to send second configuration information to the terminal device, the second configuration information including a value of K.

Optionally, the communication unit 610 is further configured to receive the to-be-reported value sent by the terminal device using a radio resource control (RRC) signaling, a MAC CE or a PUCCH.

Optionally, the interference or signal received power measurement includes CLI measurement.

It should be understood that the network device 600 may correspond to the network device in the method 400, and may implement corresponding operations of the network device in the method 400, which will not be repeated herein for sake of brevity.

Figure 7:
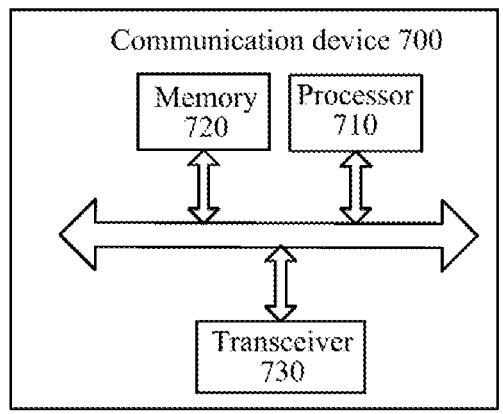
FIG. 7 is a schematic block diagram of a communication device in accordance with an implementation of the present disclosure.

FIG. 7 is a schematic diagram of a structure of a communication device 700 provided by an implementation of the present disclosure. The communication device 700 shown in FIG. 7 includes a processor 710 which may call and run a computer program from a memory to implement the methods in accordance with the implementations of the present disclosure.

Optionally, as shown in FIG. 7, the communication device 700 may further include a memory 720. The processor 710 may call and run the computer program from the memory 720 to implement the methods in accordance with the implementations of the present disclosure.

The memory 720 may be a separate device independent of the processor 710, or may be integrated in the processor 710.

Optionally, as shown in FIG. 7, the communication device 700 may further include a transceiver 730. The processor 710 may control the transceiver 730 to communicate with other devices. Specifically, the transceiver 730 may send information or data to other devices or receive information or data sent by other devices.

The transceiver 730 may include a transmitter and a receiver. The transceiver 730 may further include antennas the quantity of which may be one or more.

Optionally, the communication device 700 may specifically be the network device in the implementations of the present disclosure, and the communication device 700 may implement the corresponding processes implemented by the network device in various methods in accordance with the implementations of the present disclosure, which will not be repeated herein for brevity.

Optionally, the communication device 700 may specifically be the terminal device in the implementations of the present disclosure, and the communication device 700 may implement the corresponding processes implemented by the terminal device in various methods in accordance with the implementations of the present disclosure, which will not be repeated herein for brevity.

Figure 8:
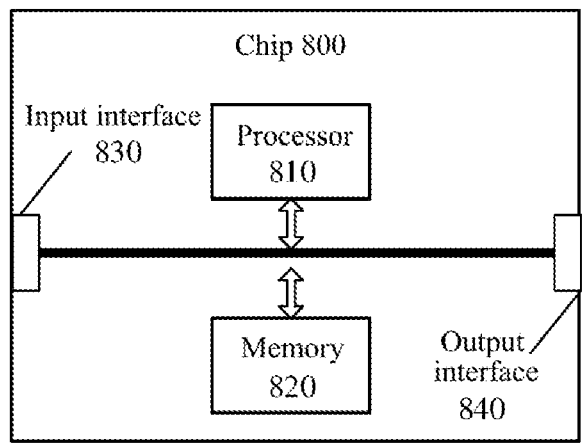
FIG. 8 is a schematic block diagram of a chip in accordance with an implementation of the present disclosure.

FIG. 8 is a schematic diagram of a structure of a chip in accordance with an implementation of the present disclosure. The chip 800 shown in FIG. 8 includes a processor 810. The processor 810 may call and run a computer program from a memory to implement the methods in accordance with the implementations of the present disclosure.

Optionally, as shown in FIG. 8, the chip 800 may further include a memory 820. The processor 810 may call and run a computer program from the memory 820 to implement the methods in accordance with the implementations of the present disclosure.

The memory 820 may be a separate device independent of the processor 810 or may be integrated in the processor 810.

Optionally, the chip 800 may further include an input interface 830. The processor 810 may control the input interface 830 to communicate with other devices or chips. Specifically, the processor 810 may acquire information or data sent by other devices or chips.

Optionally, the chip 800 may further include an output interface 840. The processor 810 may control the output interface 840 to communicate with other devices or chips. Specifically, the processor 810 may output information or data to other devices or chips.

Optionally, the chip may be applied to the terminal device in the implementations of the present disclosure, and the chip may implement the corresponding processes implemented by the terminal device in various methods in accordance with the implementations of the present disclosure, which will not be repeated herein for brevity.

Optionally, the chip may be applied to the network device in the implementations of the present disclosure, and the chip may implement the corresponding processes implemented by the network device in various methods in accordance with the implementations of the present disclosure, which will not be repeated herein for brevity.

It should be understood that the chip mentioned in the implementations of the present disclosure may be referred to as a system-level chip, a system chip, a chip system or a system-on-chip, etc.

It should be understood that the processor in the implementations of the present disclosure may be an integrated circuit chip having a signal processing capability. In an implementation process, each of the acts of the foregoing method implementations may be completed through an integrated logic circuit of hardware in the processor or instructions in a form of software. The processor described above may be a general purpose processor, a digital signal processor (DSP), an application specific integrated circuit (ASIC), a field programmable gate array (FPGA) or other programmable logic devices, a discrete gate or a transistor logic device, or a discrete hardware component. The processor may implement or perform various methods, acts and logical block diagrams disclosed in the implementations of the present disclosure. The general purpose processor may be a microprocessor, or the processor may also be any conventional processor, or the like. The acts of the methods disclosed in the implementations of the present disclosure may be directly embodied to be completed by a hardware decoding processor, or may be completed by a combination of hardware in the decoding processor and software modules. The software modules may be located in a storage medium which is mature in the art, such as a random access memory, a flash memory, a read-only memory, a programmable read-only memory, an electrically erasable programmable memory, a register. The storage medium is located in the memory, and the processor reads information in the memory and completes the acts of the foregoing methods in combination with its hardware.

It may be understood that the memory in the implementations of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through exemplary but non-restrictive description, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct Rambus random access memory (DR RAM). It should be noted that the memory in the systems and methods described herein is intended to include, but not be limited to, these and any other suitable types of memories.

It should be understood that the foregoing memory is described in an exemplary but non-limiting sense. For example, the memory in the implementations of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a direct Rambus RAM (DR RAM), or the like. That is, the memory in the implementations of the present disclosure is intended to include, but not be limited to, these and any other suitable types of memories.

Figure 9:
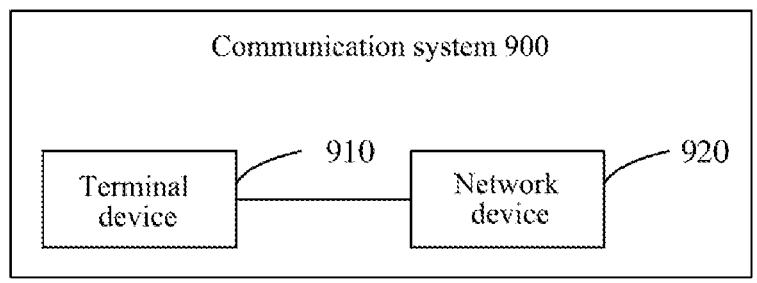
FIG. 9 is a schematic block diagram of a communication system in accordance with an implementation of the present disclosure.

FIG. 9 is a schematic block diagram of a communication system 900 in accordance with an implementation of the present disclosure. As shown in FIG. 9, the communication system 900 includes a terminal device 910 and a network device 920.

Herein, the terminal device 910 may be used for implementing the corresponding functions implemented by the terminal device in the above methods, the network device 920 may be used for implementing the corresponding functions implemented by the network device in the above methods, which will not be repeated herein for brevity.

An implementation of the present disclosure further provides a computer readable storage medium for storing a computer program.

Optionally, the computer readable storage medium may be applied in the terminal device in the implementations of the present disclosure, and the computer program enables a computer to perform the corresponding processes implemented by the terminal device in various methods of the implementations of the present disclosure, which will not be repeated herein for brevity.

Optionally, the computer readable storage medium may be applied in the network device in the implementations of the present disclosure, and the computer program enables a computer to perform the corresponding processes implemented by the network device in various methods of the implementations of the present disclosure, which will not be repeated herein for brevity.

An implementation of the present disclosure further provides a computer program product including computer program instructions.

Optionally, the computer program product may be applied in the terminal device in the implementations of the present disclosure, and the computer program instructions enable a computer to perform the corresponding processes implemented by the terminal device in various methods of the implementations of the present disclosure, which will not be repeated herein for brevity.

Optionally, the computer program product may be applied in the network device in the implementations of the present disclosure, and the computer program instructions enable a computer to perform the corresponding processes implemented by the network device in various methods of the implementations of the present disclosure, which will not be repeated herein for brevity.

An implementation of the present disclosure further provides a computer program.

Optionally, the computer program may be applied in the terminal device in the implementations of the present disclosure, and the computer program, when running on a computer, enables the computer to perform the corresponding processes implemented by the terminal device in various methods of the implementations of the present disclosure, which will not be repeated herein for brevity.

Optionally, the computer program may be applied to the network device in the implementations of the present disclosure, and the computer program, when running on a computer, enables the computer to perform the corresponding processes implemented by the network device in various methods of the implementations of the present disclosure, which will not be repeated herein for brevity.

A person of ordinary skill in the art may recognize that the elements and algorithm acts in various examples described in combination with the implementations disclosed herein can be implemented in electronic hardware, or a combination of computer software and electronic hardware. Whether these functions are implemented in hardware or software depends on the specific application and design constraints of the technical scheme. Skilled artisans may use different methods to implement the described functions for each particular application, but such an implementation should not be considered to be beyond the scope of the present disclosure.

Those skilled in the art may clearly understand that for the sake of convenience and conciseness of description, the specific working processes of the systems, devices and units described above may refer to the corresponding processes in the above method implementations and will not be repeated herein.

In several implementations provided by the present disclosure, it should be understood that the disclosed systems, devices and methods may be implemented in other ways. For example, the device implementations described above are only illustrative, for example, the division of the units is only a logical function division, and there may be other division manners in actual implementation. For example, multiple units or components may be combined or integrated into another system, or some features may be ignored or not executed. In addition, the shown or discussed coupling or direct coupling or communication connection between each other may be an indirect coupling or communication connection through some interfaces, devices or units, or may be in electrical, mechanical or other forms.

The unit described as a separate component may or may not be physically separated, and the component shown as a unit may or may not be a physical unit, i.e., it may be located in one place or may be distributed on multiple network units. Part or all of the units may be selected according to actual needs to achieve the purpose of the scheme of the implementations.

In addition, various functional units in various implementations of the present disclosure may be integrated into one processing unit, or may exist physically separately, or two or more than two units may be integrated into one unit.

The function, if implemented in a form of software functional unit and sold or used as an independent product, may be stored in a computer readable storage medium. Based on such understanding, the technical scheme of the present disclosure, in essence, or the part contributing to the prior art, or the part of the technical scheme, may be embodied in the form of a software product, which is stored in a storage medium and includes a few instructions for enabling a computer device (which may be a personal computer, a server, or a network device, etc.) to perform all or part of the acts of various implementations of the present disclosure. The aforementioned storage medium includes various media, such as a U disk, a mobile hard disk, a read-only memory (ROM), a random access memory (RAM), a magnetic disk, or an optical disk, which are capable of storing program codes.

What are described above are merely specific implementations of the present disclosure, but the protection scope of the present disclosure is not limited thereto. Any variation or substitution that may easily be conceived by a person skilled in the art within the technical scope disclosed by the present disclosure shall be included within the protection scope of the present disclosure. Therefore, the protection scope of the present disclosure shall be subject to the protection scope of the claims.

What we claim is:

1. A method for interference or signal received power measurement, comprising:
    measuring, by a terminal device, an interference or signal received power for a sounding reference signal (SRS) resource to obtain a reference signal received power (RSRP) value corresponding to at least one SRS resource, wherein the interference or signal received power measurement comprises cross-link interference (CLI) measurement;
    determining, by the terminal device, a to-be-reported value based on the RSRP value corresponding to the at least one SRS resource; and
    reporting, by the terminal device, the to-be-reported value to a network device; wherein determining, by the terminal device, the to-be-reported value based on the RSRP value corresponding to the at least one SRS resource comprises:
    determining, by the terminal device, a set of RSRP values based on the RSRP value corresponding to the at least one SRS resource; and
    determining, by the terminal device, the to-be-reported value based on the set of RSRP values;
    wherein determining, by the terminal device, the to-be-reported value based on the set of RSRP values comprises:
    determining, by the terminal device, the to-be-reported value based on a measurement interval to which each RSRP value in the set of RSRP values belongs and a mapping relationship between at least one measurement interval of RSRP value and a to-be-reported value, wherein the at least one measurement interval comprises a plurality of measurement intervals, and a difference between a maximum value and a minimum value of each of other measurement intervals except a measurement interval to which a minimum RSRP value belongs and a measurement interval to which a maximum RSRP value belongs, in the plurality of measurement intervals, is the same.

2. The method of claim 1, wherein measuring, by the terminal device, the interference or signal received power for the sounding reference signal (SRS) resource to obtain the reference signal received power (RSRP) value corresponding to the at least one SRS resource comprises:
    measuring, by the terminal device, a plurality of SRS resources to obtain a plurality of RSRP values, wherein an $m^{th}$ RSRP value of the plurality of RSRP values is obtained by measuring an $m^{th}$ SRS resource of the plurality of SRS resources by the terminal device.

3. The method of claim 1, wherein in the mapping relationship between the measurement intervals and to-be-reported values, the difference between the maximum value and the minimum value of the measurement interval is 1 dB.

4. The method of claim 1, wherein when the to-be-reported value comprises a plurality of values, an order in which the terminal device reports the plurality of values to the network device is determined according to sizes of the plurality of values; or
    an order in which the terminal device reports the plurality of values to the network device is determined according to value sizes of SRS resource identifiers corresponding to the plurality of values.

5. The method of claim 1, further comprising:
    reporting, by the terminal device, an SRS resource identifier corresponding to the to-be-reported value to the network device.

6. The method of claim 1, wherein a threshold value is preset at the terminal device, or a threshold value is sent by the network device to the terminal device.

7. The method of claim 1, wherein the terminal device reports to the network device through a radio resource control (RRC) signaling.

8. A terminal device, comprising: a processor and transceiver, wherein
    the processor is configured to measure an interference or signal received power for a sounding reference signal (SRS) resource to obtain a reference signal received power (RSRP) value corresponding to at least one SRS resource, wherein the interference or signal received power measurement comprises cross-link interference (CLI) measurement;
    wherein the processor is further configured to determine a to-be-reported value based on the RSRP value corresponding to the at least one SRS resource; and
    the transceiver is configured to report the to-be-reported value to a network device; wherein the processor is specifically configured to:
    determine a set of RSRP values based on the RSRP value corresponding to the at least one SRS resource; and
    determine the to-be-reported value based on the set of RSRP values; wherein the processor is specifically configured to:
    determine the to-be-reported value based on a measurement interval to which each RSRP value in the set of RSRP values belongs and a mapping relationship between at least one measurement interval of RSRP value and a to-be-reported value, wherein the at least one measurement interval comprises a plurality of measurement intervals, and a difference between a maximum value and a minimum value of each of other measurement intervals except a measurement interval to which the minimum RSRP value belongs and a measurement interval to which a maximum RSRP value belongs, in the plurality of measurement intervals, is the same.

9. The terminal device of claim 8, wherein the processor is specifically configured to:
  measure a plurality of SRS resources to obtain a plurality of RSRP values, wherein an $m^{th}$ RSRP value of the plurality of RSRP values is obtained by measuring an $m^{th}$ SRS resource of the plurality of SRS resources by the terminal device.

10. The terminal device of claim 8, wherein in the mapping relationship between the measurement intervals and to-be-reported values, the difference between the maximum value and the minimum value of the measurement interval is 1 dB.

11. The terminal device of claim 8, wherein if the to-be-reported value comprises a plurality of values, an order in which the terminal device reports the plurality of values to the network device is determined according to sizes of the plurality of values; or
  an order in which the terminal device reports the plurality of values to the network device is determined according to value sizes of SRS resource identifiers corresponding to the plurality of values.

12. The terminal device of claim 8, wherein the transceiver is further configured to:
  report an SRS resource identifier corresponding to the to-be-reported value to the network device.

13. The terminal device of claim 8, wherein a threshold value is preset at the terminal device, or a threshold value is sent by the network device to the terminal device.

14. The terminal device of claim 8, wherein the terminal device reports to the network device through a radio resource control (RRC) signaling.

* * * * *